(No Model.) 11 Sheets—Sheet 2.

E. B. BEECHER & J. P. WRIGHT.
MACHINE FOR MAKING MATCHES.

No. 557,946. Patented Apr. 7, 1896.

Witnesses:
Jas. E. Hutchinson.
Henry C. Hazard.

Inventor
Ebenezer B. Beecher
and Jacob P. Wright
by Prindle & Russell
their Attorneys (No Model.) 11 Sheets—Sheet 3.

E. B. BEECHER & J. P. WRIGHT.
MACHINE FOR MAKING MATCHES.

No. 557,946. Patented Apr. 7, 1896.

Witnesses:
Jas. E. Hutchinson
Henry C. Hazard

Inventors.
Ebenezer B. Beecher
and Jacob P. Wright
by Prindle and Russell
their Attorneys (No Model.) 11 Sheets—Sheet 4.

E. B. BEECHER & J. P. WRIGHT.
MACHINE FOR MAKING MATCHES.

No. 557,946. Patented Apr. 7, 1896.

(No Model.) 11 Sheets—Sheet 5.

E. B. BEECHER & J. P. WRIGHT.
MACHINE FOR MAKING MATCHES.

No. 557,946. Patented Apr. 7, 1896.

Witnesses:
Jas. E. Hutchinson.
Henry C. Hazard.

Inventors:
Ebenezer B. Beecher
and Jacob P. Wright
by Russell
their Attorney (No Model.) 11 Sheets—Sheet 6.

E. B. BEECHER & J. P. WRIGHT.
MACHINE FOR MAKING MATCHES.

No. 557,946. Patented Apr. 7, 1896.

Witnesses:
Jas. E. Hutchinson.
Henry C. Hazard.

Inventors.
Ebenezer B. Beecher
and Jacob P. Wright
by Pyndle & Russell
their Attorneys (No Model.) 11 Sheets—Sheet 7.

E. B. BEECHER & J. P. WRIGHT.
MACHINE FOR MAKING MATCHES.

No. 557,946. Patented Apr. 7, 1896.

Witnesses:
Jas. E. Hutchinson.
Henry C. Hazard.

Inventors:
Ebenezer B. Beecher
and Jacob P. Wright
by Prindle and Russell
his attorneys (No Model.) 11 Sheets—Sheet 8.
E. B. BEECHER & J. P. WRIGHT.
MACHINE FOR MAKING MATCHES.
No. 557,946. Patented Apr. 7, 1896.
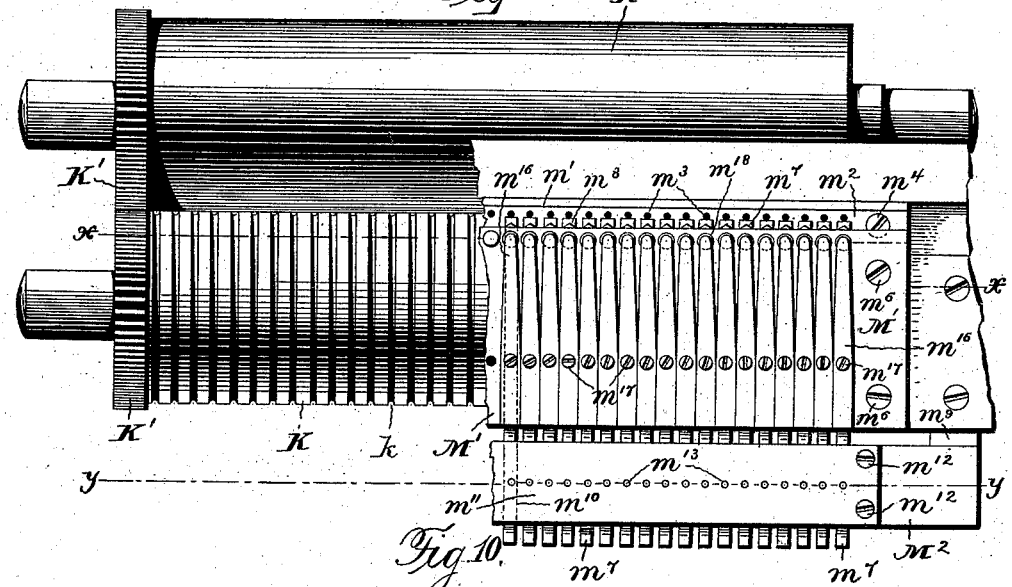
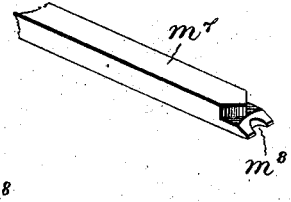
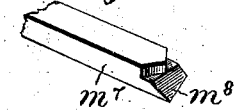
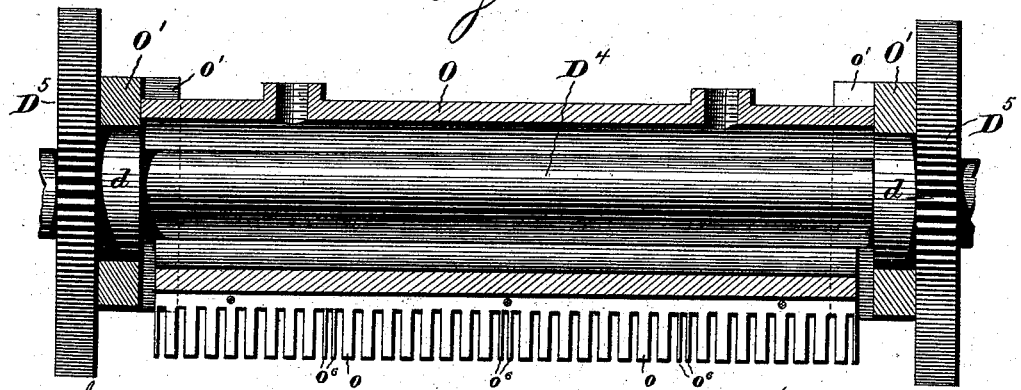

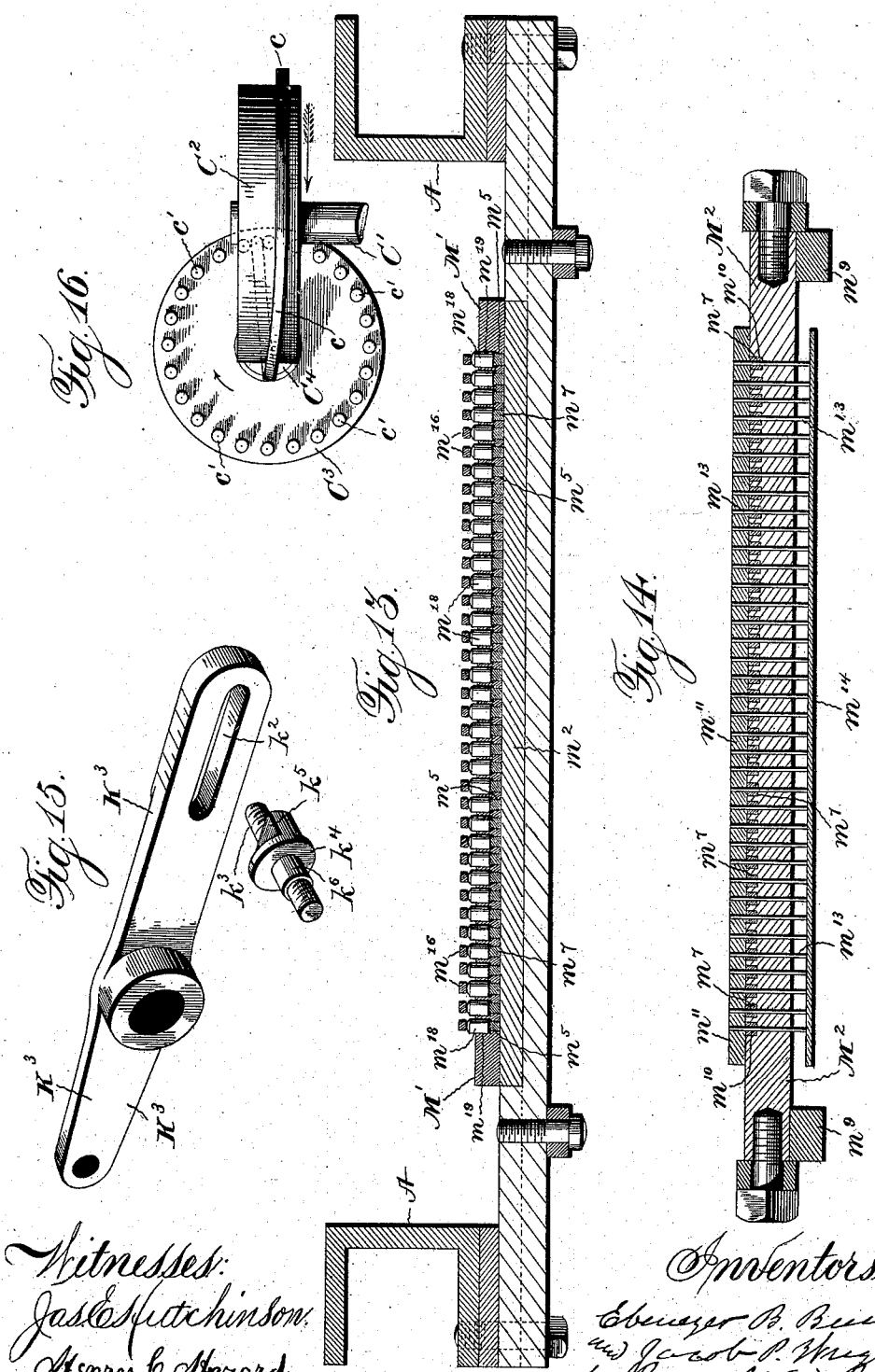

(No Model.) 11 Sheets—Sheet 10.
E. B. BEECHER & J. P. WRIGHT.
MACHINE FOR MAKING MATCHES.
No. 557,946. Patented Apr. 7, 1896.
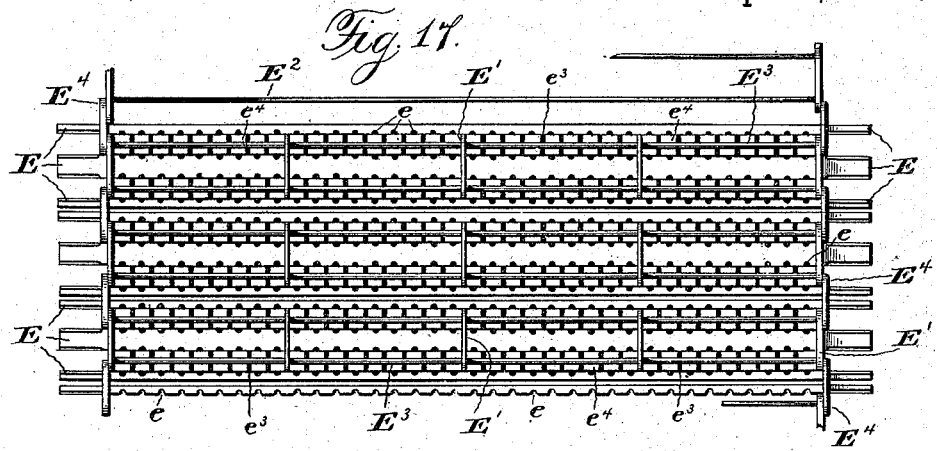
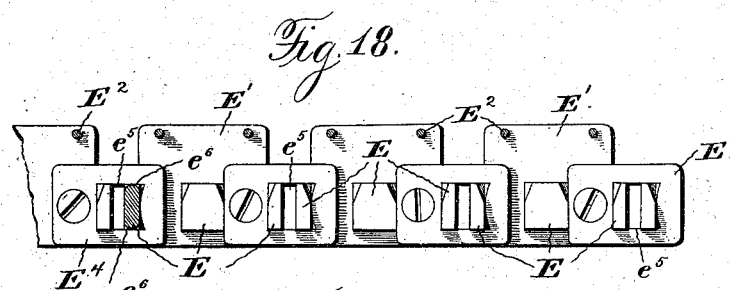
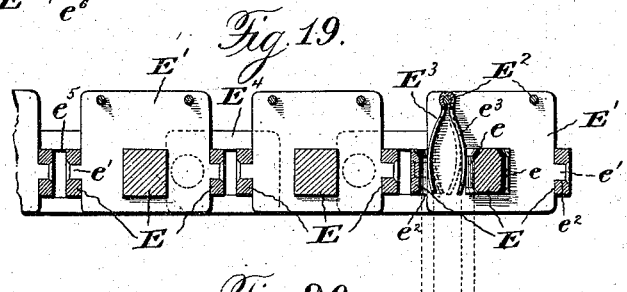
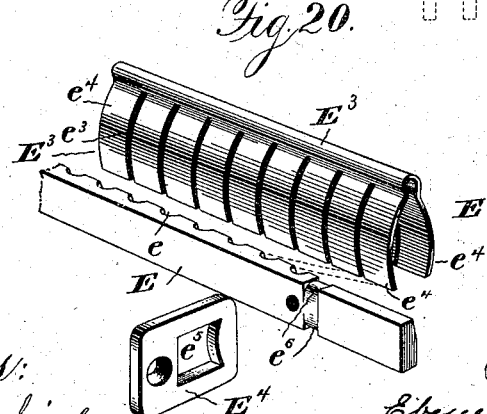

(No Model.) 11 Sheets—Sheet 11.
E. B. BEECHER & J. P. WRIGHT.
MACHINE FOR MAKING MATCHES.
No. 557,946. Patented Apr. 7, 1896.
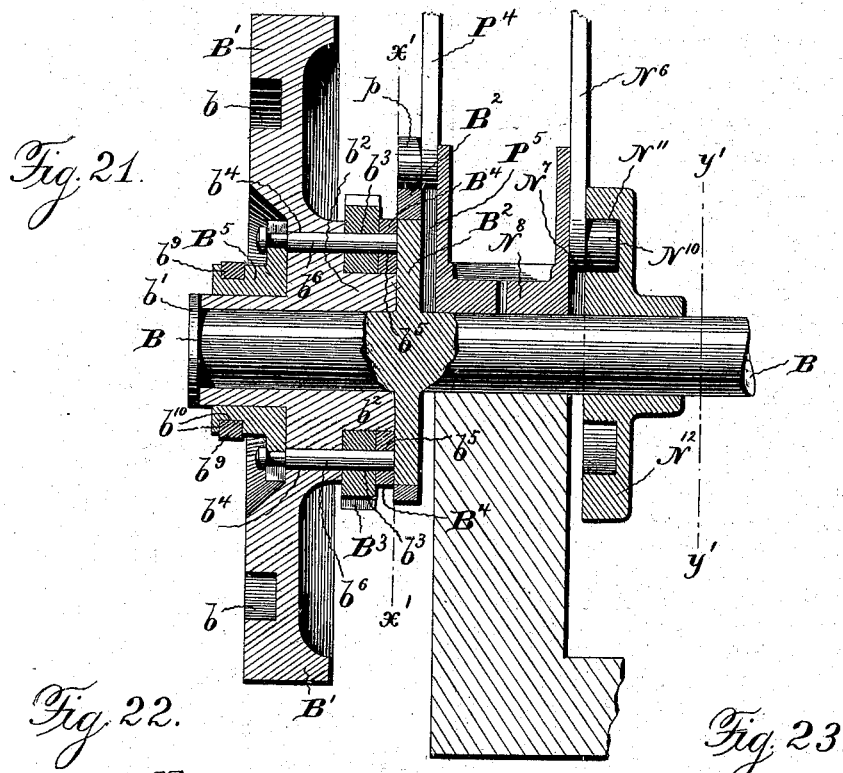
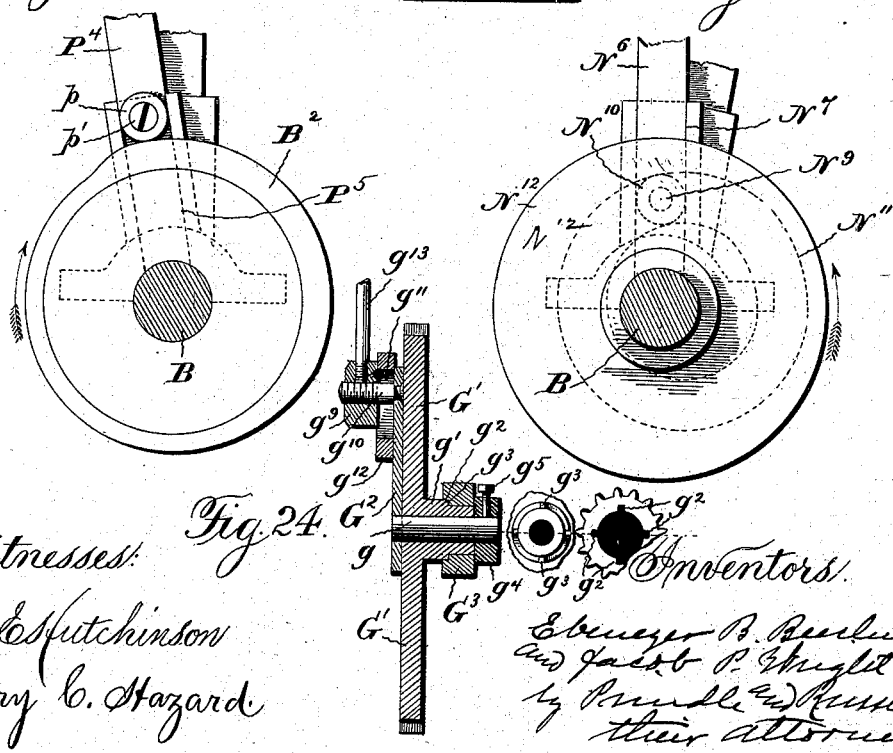
Witnesses:
Jas. E. Hutchinson
Henry C. Hazard
Inventors.
Ebenezer B. Beecher
and Jacob P. Wright
by Prindle & Russell
their attorneys

UNITED STATES PATENT OFFICE.

EBENEZER B. BEECHER, OF WESTVILLE, AND JACOB P. WRIGHT, OF NEW HAVEN, CONNECTICUT, ASSIGNORS TO THE DIAMOND MATCH COMPANY, OF CHICAGO, ILLINOIS.

MACHINE FOR MAKING MATCHES.

SPECIFICATION forming part of Letters Patent No. 557,946, dated April 7, 1896.

Application filed March 20, 1895. Serial No. 542,507. (No model.)

*To all whom it may concern:*

Be it known that we, EBENEZER B. BEECHER, of Westville, and JACOB P. WRIGHT, of New Haven, in the county of New Haven, and in the State of Connecticut, have invented certain new and useful Improvements in Machines for Making Matches; and we do hereby declare that the following is a full, clear, and exact description thereof, reference being had to the accompanying drawings, in which—

Figure 1:
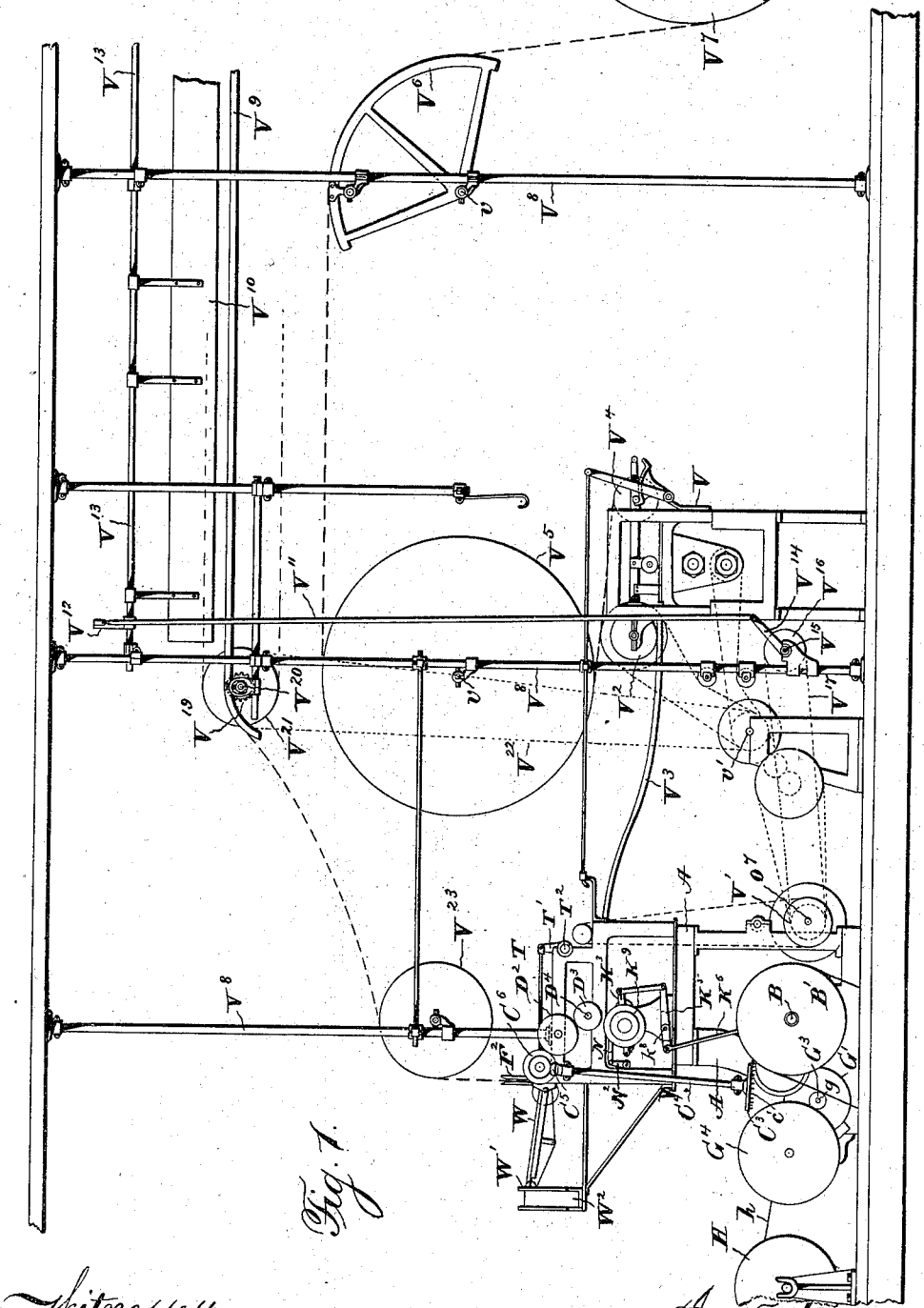
Figure 2:
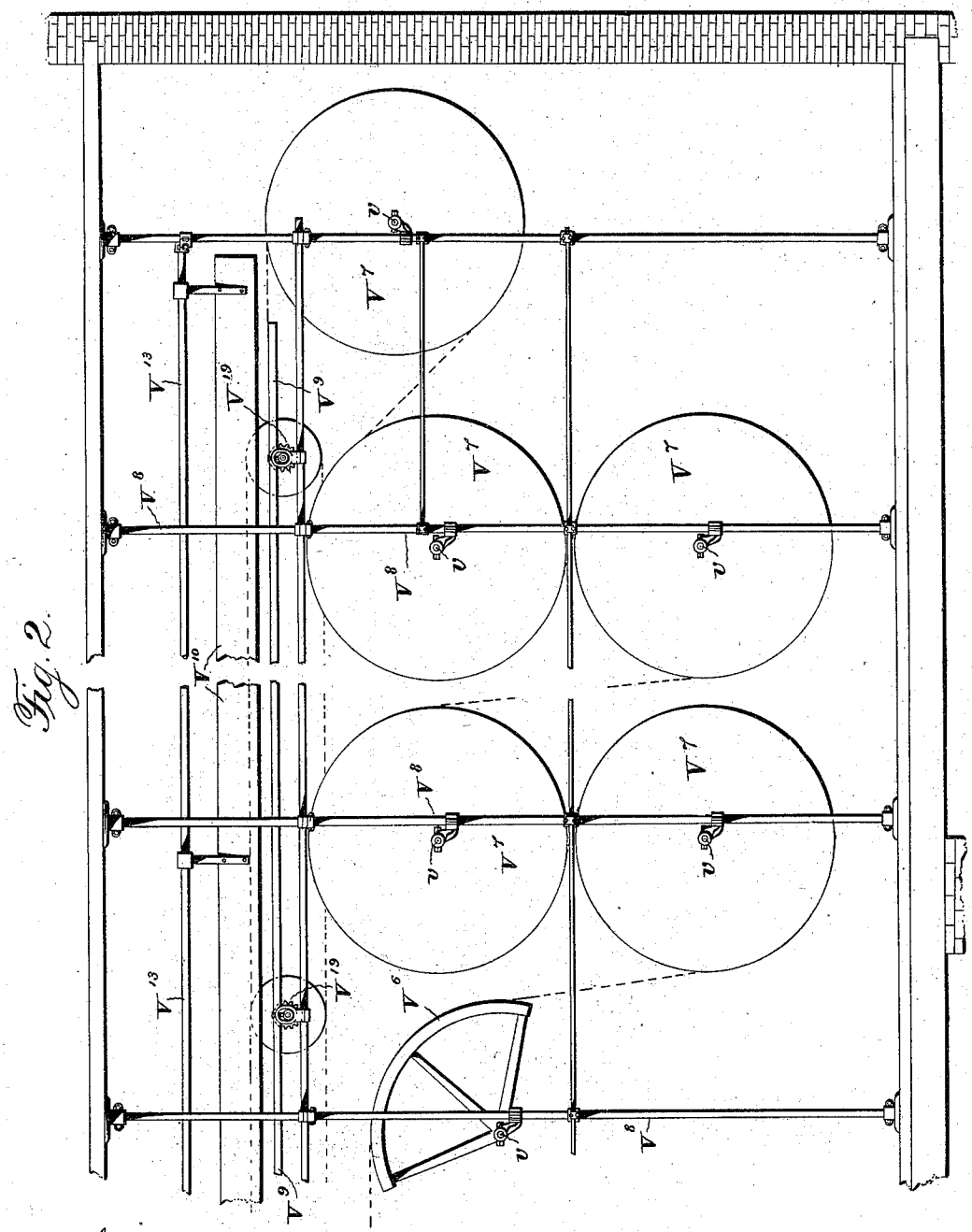
Figure 3:
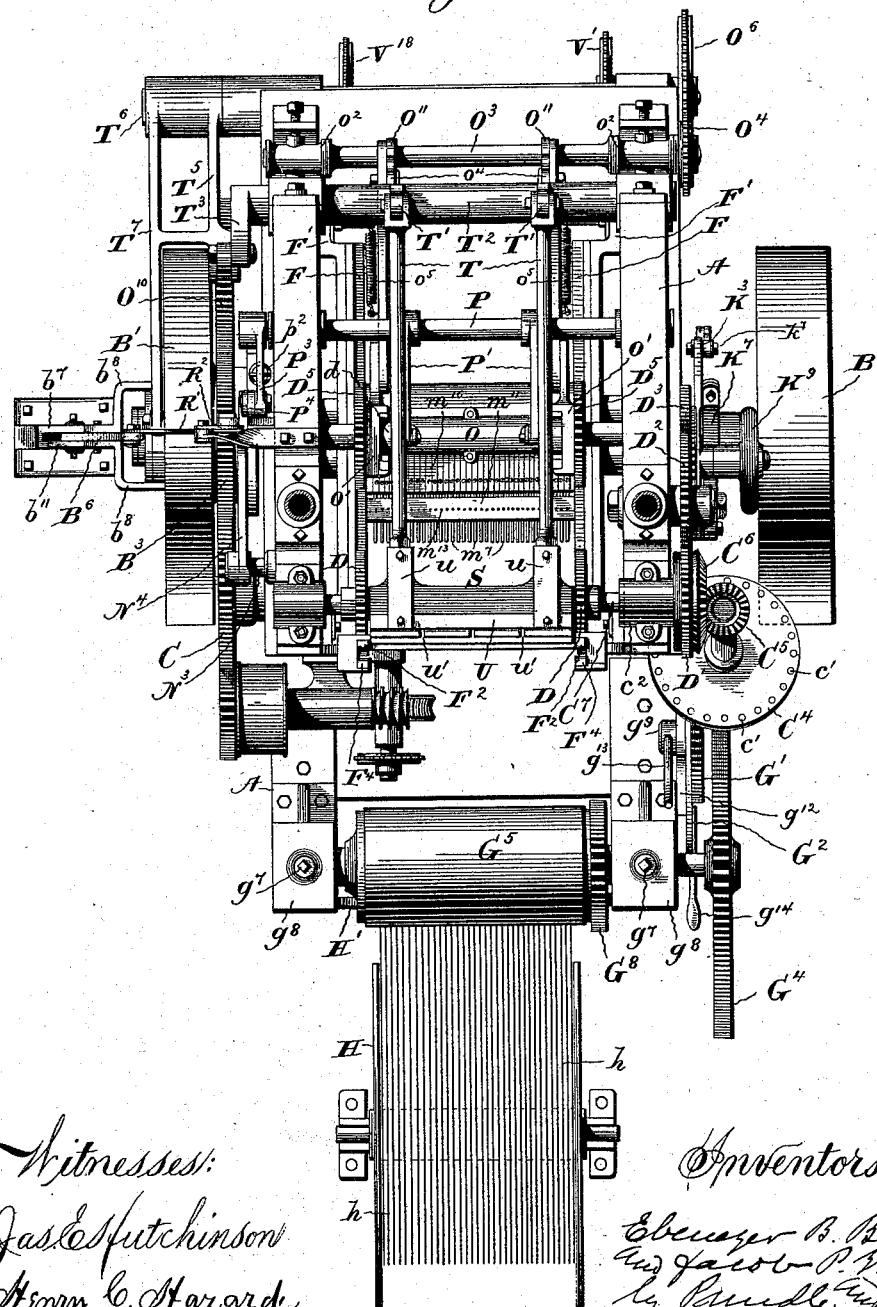
Figure 4:
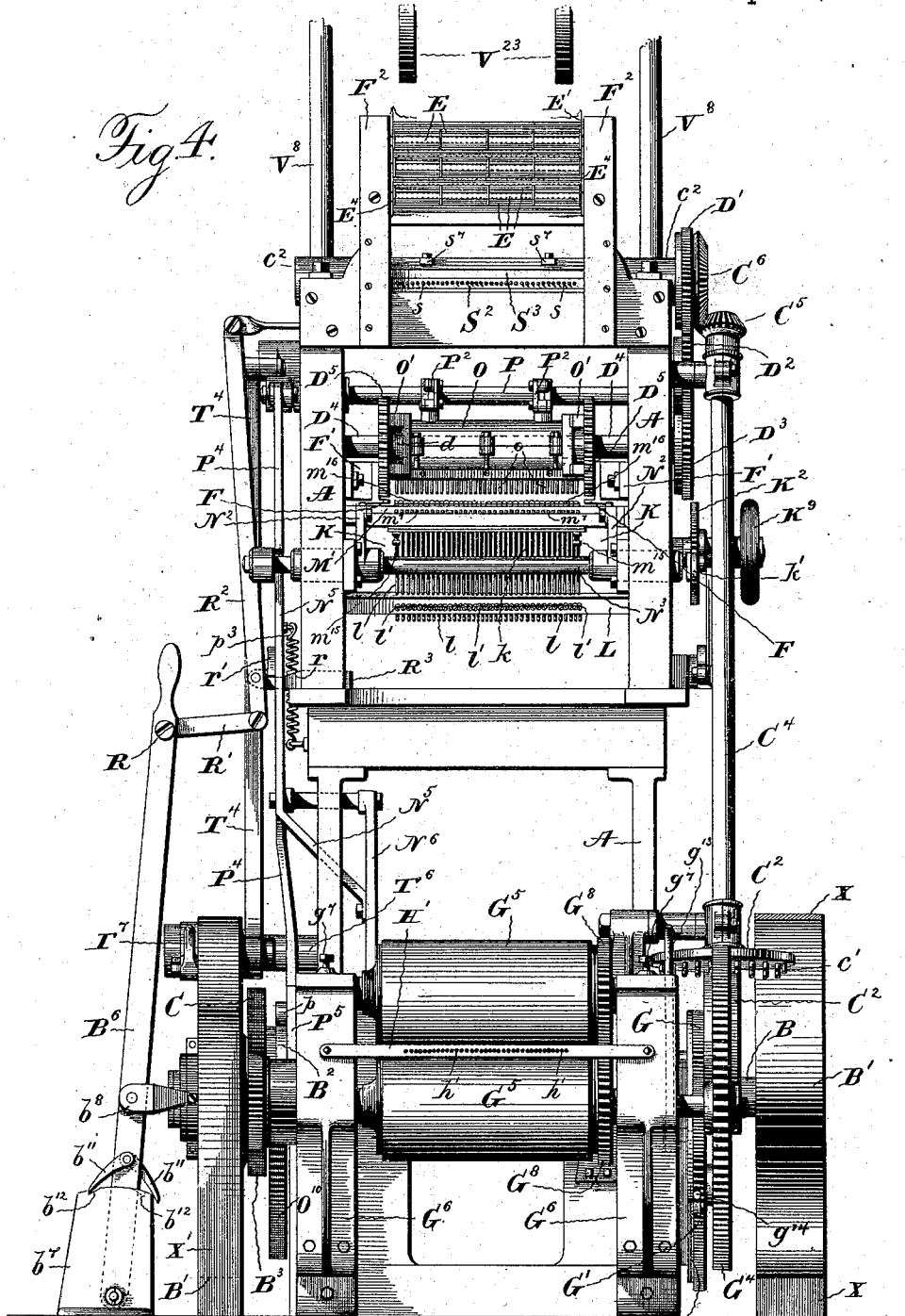
Figure 5:
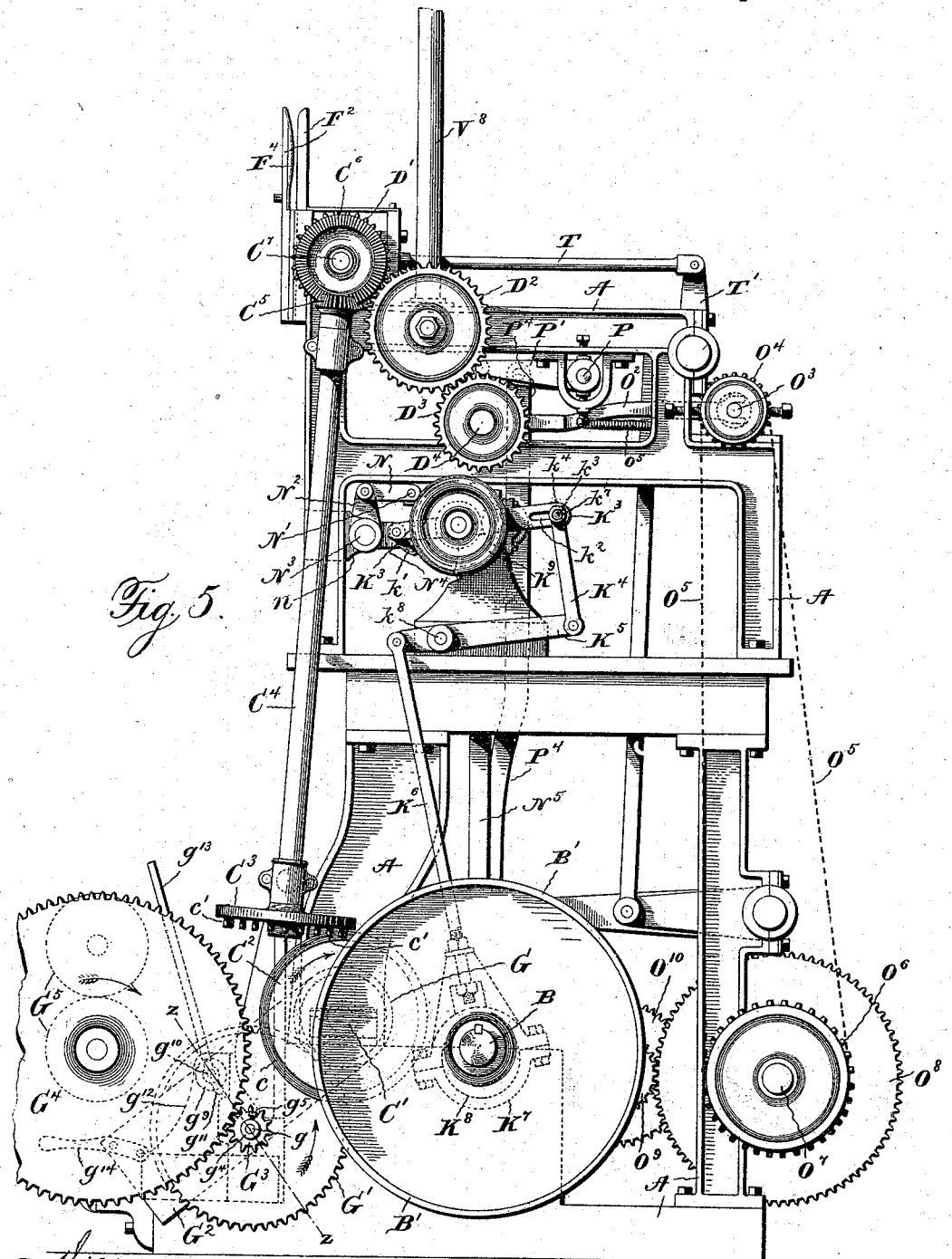
Figure 6:
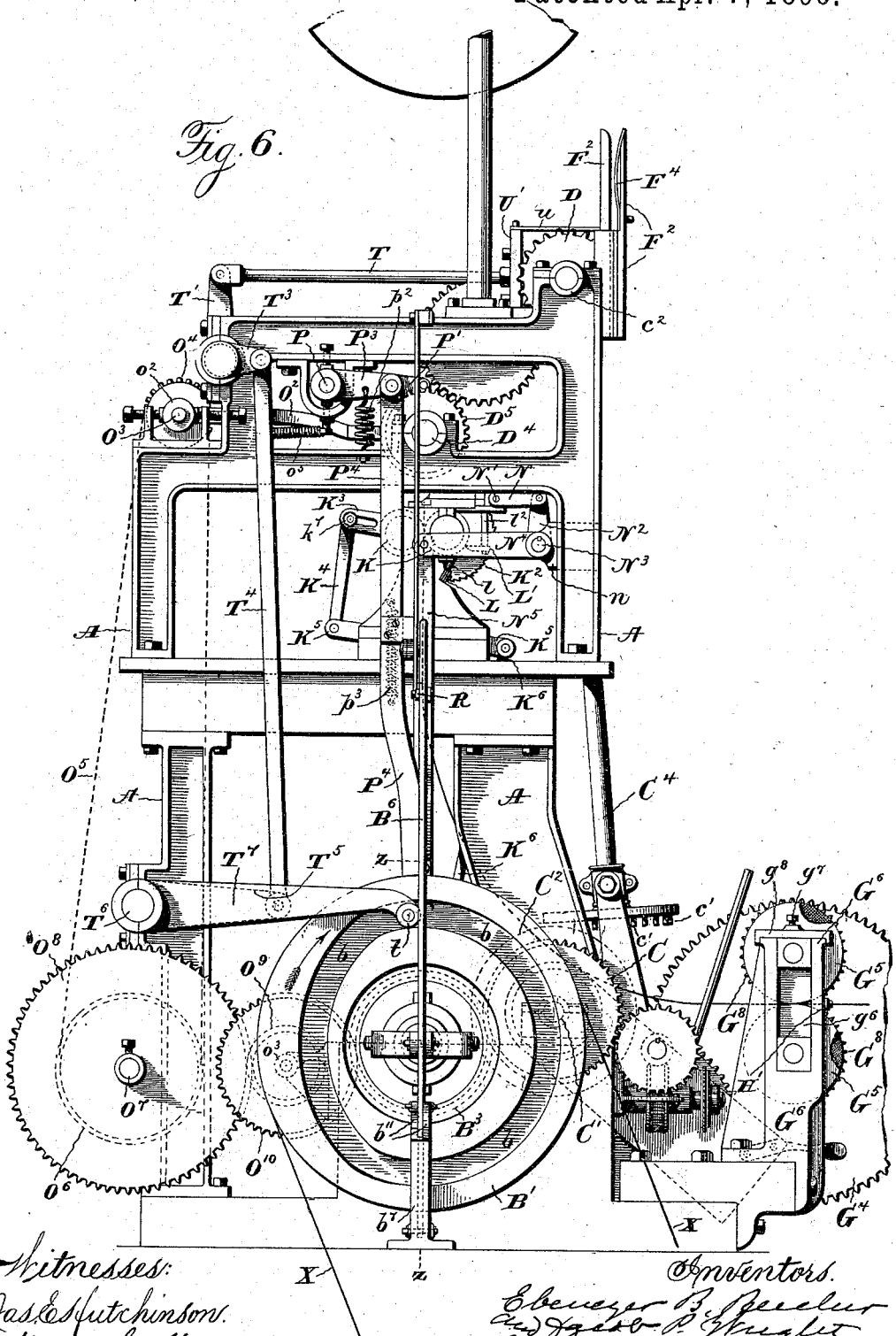
Figure 7:
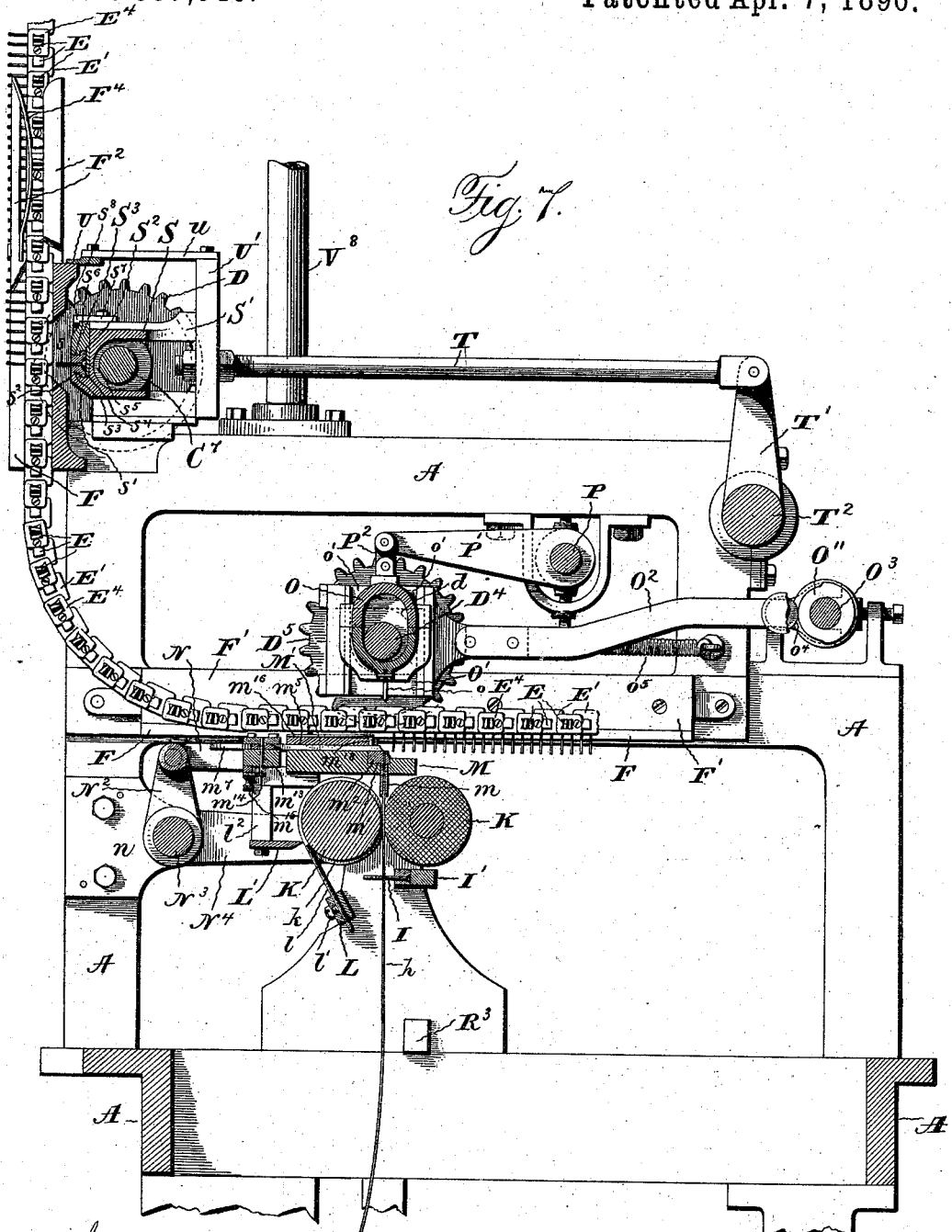

Figure 1 shows a diagrammatic view of our machine with the wheels or pulleys for supporting the carrier-chain during the drying and cooling of the match-heads left off; Fig. 2, a similar view showing such wheels or pulleys and the drying and cooling devices; Fig. 3, a plan view, on an enlarged scale, of the forward or main part of the machine with the carrier-chain removed; Fig. 4, a view of the same in front elevation with a portion of the carrier-chain shown in place; Fig. 5, a view in side elevation of the part of the machine shown in Fig. 3; Fig. 6, a similar view of the opposite side of the machine; Fig. 7, a sectional view showing, on an enlarged scale, the means for moving and guiding the carrier-chain, the mechanism for securing the insertion of the match-blanks in the carrier and cutting them off, and the means for discharging the completed matches from the carrier; Fig. 8, a detail plan view, on an enlarged scale, of the feed-rollers and the cutting device; Fig. 9, a detail view of one of the cutter-bars; Fig. 10, a similar view of a cutter-bar with a different form of cutting edge; Fig. 11, a similar view of a cutter-bar with still another form of edge; Fig. 12, a view, on an enlarged scale, of a longitudinal section of the moving body of the opener-comb; Fig. 13, a view of a section on line $x\,x$ of Fig. 8 with the cutter-bars and the supporting and guiding devices therefor complete; Fig. 14, a view of a similar section on line $y\,y$ of Fig. 8; Fig. 15, a detail perspective view of the lever for turning the feed-rolls and the adjustable pin carried by such lever; Fig. 16, a detail view showing in elevation the pin and cam-wheel device for feeding the carrier; Fig. 17, a plan view showing, upon an enlarged scale, a portion of the endless-chain carrier; Fig. 18, a view showing, on a still more enlarged scale, a portion of the carrier-chain in side elevation; Fig. 19, a view of a longitudinal section of a portion of the carrier-chain as shown in Fig. 18; Fig. 20, a detail view showing in perspective portions of the carrier-chain separated from each other; Fig. 21, a detail view, on an enlarged scale, showing a vertical section on line $z\,z$ of Fig. 6 with the clutch-fork and actuating-lever removed; Fig. 22, a view of a section on line $x'\,x'$ of Fig. 21; Fig. 23, a view of a section on line $y'\,y'$ of Fig. 21, and Fig. 24 a view of a section on line $z'\,z'$ of Fig. 5.

Letters of like name and kind refer to like parts in each of the figures.

The object of our invention has been to provide a machine for making wax matches; and to this end our invention consists in the machine and in the construction, arrangement, and combination of the parts thereof as hereinafter specified.

While in devising our present machine we have had especially in view the production of means for making matches from wax taper, we desire it to be understood that the mechanism is also applicable to and capable of employment to advantage in the manufacture of matches from other stock or material than the waxed cord employed to form the bodies or sticks of wax matches.

In describing our invention hereinafter we shall, for convenience sake, describe the machine as applied to the making of matches from such waxed cord or taper, but with the understanding that we do not limit ourselves to the use of such stock for the match-sticks, but contemplate employing the mechanism also in making matches from any other suitable material.

In the drawings, A A designate the frame of the main part of our machine. Such frame, which can be of any desired shape and material, consists, as shown, broadly, of two vertical side portions projecting upward from a suitable base and connected by cross-pieces to form a strong rigid frame. Journaled in bearings in the lower part of such frame is the main shaft B, which has on its opposite ends the two belt or band wheels B' B', the former being fixed on the shaft and the latter being mounted loosely thereon. This latter wheel, which carries a cam-groove $b$, for a purpose to be described hereinafter, is held from longitudinal movement on the shaft by the collar $b'$ and the cam-disk $B^2$, both fixed on the shaft and engaging, respectively, the outer and inner ends of the hub $b^2$ of the cam-carrying wheel B'. A gear-wheel $B^3$, mounted on the inner end of such hub, has holes $b^3$ $b^3$ through it, adapted to register with corresponding holes $b^4$ $b^4$ in the wheel B', while fixed on cam-disk $B^2$ is a ring $B^4$, having similarly-arranged holes $b^5$ $b^5$.

On the outer end of the hub $b^2$ is the sliding sleeve $B^5$, having attached to it the pins $b^6$ $b^6$, passing through the holes $b^3$ $b^3$ and $b^4$ $b^4$ in the gear-wheel and cam-wheel, respectively, and adapted to be brought into and out of engagement with the holes $b^5$ $b^5$ in ring $B^4$ as the sleeve $B^5$ is moved in and out. When the sleeve has been moved inward on hub $b'$ so as to carry the inner ends of pins $b^6$ $b^6$ into holes $b^5$ $b^5$ of the ring $B^4$, the gear-wheel $B^3$, cam-wheel B', and shaft B must rotate together, because of the rigid connection between the latter and the cam-disk $B^2$, to which ring $B^4$ is fastened. When the sleeve is drawn outward to disengage the pins from the holes in the ring, the cam-wheel B' and the gear-wheel $B^3$ are left free to rotate without turning the shaft. The purpose and object of this arrangement will be set forth at length hereinafter.

For moving the sleeve in and out on hub $b^2$ we have provided the lever $B^6$, pivoted to a block $b^7$ and having pivoted to it a fork $b^8$, whose arms are connected with a collar $b^9$, journaled in a groove $b^{10}$ in the sleeve $B^5$, so that the latter must move in and out with the collar while being free to rotate with reference to the same.

For locking the lever at the inner and outer limits of its motion to secure the desired clutching and unclutching of the cam-wheel B' and gear-wheel $B^3$ and the driving-shaft we provide the lever with the two opposite projecting pivoted pawls $b^{11}$ $b^{11}$ and form the block $b^7$ with the two locking-notches $b^{12}$ $b^{12}$, the one to engage the outwardly-extending pawl when the lever is moved inward and the other to engage the other pawl to hold the lever, as moved outward, to disconnect the cam-disk and pinion from the shaft B.

Meshing with the gear-wheel $B^3$ is the gear C, fixed upon the counter-shaft C', journaled in suitable bearings on the frame A A and carrying upon its opposite end a cam-disk $C^2$, having on its periphery a cam-rib $c$, with a portion inclined at an angle to the line of travel of the rib as the disk rotates and another portion running parallel to such line, with its rear end separated from the forward end of the inclined portion by a space.

A disk $C^3$, fixed on the lower end of an upwardly-extending shaft $C^4$, journaled on the frame, has on its under side an annular series of pins $c'$ $c'$, adapted to be engaged by the cam-rib on disk $C^2$, so that for each full revolution of shaft C' the disk $C^3$ and shaft $C^4$ will be turned a distance equal to that between the corresponding faces of two adjoining pins by the passage of the inclined part of rib $c$ and will then be held from turning while the straight part of the rib is passing between two pins. By this means the shaft $C^4$ will be given a step-by-step movement of rotation and will be held positively locked from movement in either direction between its step-by-step motions. The upper end of the shaft carries fixed upon it the bevel-pinion $C^5$, meshing with the bevel-gear $C^6$ on the shaft $C^7$, extending transversely across the forward part of frame A A and journaled in bearings $c^2$ $c^2$ on the latter. Fixed upon this shaft between the sides of the frame are the two large toothed wheels D D for engaging and moving the endless-chain carrier, to be described hereinafter. A gear-wheel D', also fixed on shaft $C^7$, meshes with and drives gear $D^2$, journaled upon a stud on the frame, and this latter gear meshes with and drives another gear-wheel $D^3$ of the same diameter and number of teeth as gear-wheel D'.

Gear-wheel $D^3$ is fixed upon a transverse shaft $D^4$, parallel to shaft $C^7$, but lower down than and to the rear of the latter, which carries large toothed wheels $D^5$ $D^5$, similar to wheels D D on shaft $C^7$ and for the same purpose—that is, to engage and move the endless-chain carrier which is to receive and hold the match sticks or blanks of which the matches are made. Such endless-chain carrier consists, as shown best in Figs. 7, 17, and 18, of a series of sections linked together so that it can flex to change its direction between the two sets of moving wheels just above described, passing downward in front of wheels D D and then horizontally rearward under wheels $D^5$ $D^5$, and can then pass up over and under the several supporting and guiding wheels, to be described hereinafter, on its way from the place where the match blanks or sticks are inserted into it to the composition-applying device, to the drying and cooling device, and back to the toothed wheels D D again. Each section of the chain consists of three transverse parallel bars E E E, held at a distance from each other by means of the plates E' E' E' E' E', preferably, but not necessarily, five in number and arranged at equal distances apart. Of the bars, the middle one is thicker than the others and has in its opposite sides, which are at right angles to the travel of the chain, a series of grooves $e$ $e$ $e$ to receive the match blanks or sticks. The ends of these grooves are countersunk or made flaring outward.

The two outer bars E E are thinner than the middle bar and have grooves $e$ $e$ like those already described, only on their inner faces, which are turned toward the middle bar. Such grooves are arranged so as to come exactly opposite those on the middle bar. This latter bar, which is rectangular in cross-section, passes through and is firmly held in a correspondingly-shaped opening in the plates E' E', while the two outer bars of each section are fastened to the rear and front sides, respectively, of such plates, preferably, but not necessarily, by lugs $e'$ $e'$ on the plates passed through and headed down in openings $e^2$ $e^2$ in the bars, as shown in Fig. 19. All three bars of each section project beyond the outer plates E' E', so as to be engaged by the teeth on the carrier-chain-moving wheels D D and $D^5$ $D^5$, hereinbefore referred to. The projecting portions of the middle bar, which are to be engaged by said wheels, are shaped like rack-teeth, the angle of the pitch extending only part way down each side, as shown in Figs. 7 and 18. The inner sides only of the two outer bars of each section are similarly beveled or cut away to give the proper pitch for belt engagement with the teeth of the carrier-chain-moving wheels.

The grooves $e$ $e$ are preferably made half-round, and the bars of each section are arranged so that the distance between the inner faces of the outer bars and the sides of the middle one is equal to the distance from the front to the rear face of such bar. With this construction the planes in which the axes of curvature of the concavities forming the half-round grooves in adjoining bars will always be the same distance apart, so that with a uniform step-by-step forward movement of the endless-chain carrier the lines of grooves will be brought so that the centers or axes of the curvature of their concavities will stand over a given transverse line or plane in such position that the line of grooves can receive simultaneously a series of match blanks or sticks from a suitable supplying and inserting mechanism.

Upon rods $E^2$ $E^2$, passing through and supported in plates E' E' and situated centrally over the spaces between the middle bar and the two outer bars of each section of the carrier-chain, there are supported strips $E^3$ $E^3$, of sheet metal, bent on a longitudinal line so that their sides extend downward into the spaces between the bars E E below the respective rods and press outward against the grooved faces on opposite sides of such spaces. Each of the downwardly-extending portions of these plates is slit or cut at $e^3$ $e^3$ so as to leave a series of independent spring-fingers $e^4$ $e^4$, one for each groove in the face of the bar toward which such fingers spring.

Where the strips $E^3$ $E^3$ engage the rods $E^2$ $E^2$, they are preferably bent so as to nearly inclose the latter, as shown in Fig. 19, so that the rods will not only support them, but hold them down in place with their spring-fingers in position to press upon and hold any match blanks or sticks in the respective grooves.

To facilitate the insertion of such blanks or sticks in the grooves of the bars E E E, the lower ends of these fingers $e^4$ $e^4$ are bent away from the grooved face of the respective bar, while to enable the opener-comb, to be described hereinafter, to pass most easily down between the spring-fingers and the opposing bar-face the upper portions of the fingers are inclined upward and inward toward the supporting-rod $E^2$ and away from the said bar-face.

The strips $E^3$ $E^3$ are preferably made of sheet-brass, but can be of any other desired metal or material of such nature that the tongues made by slitting them will be springy enough to press upon and hold firmly in the respective grooves $e$ $e$ any match blanks or sticks inserted in the latter.

With the construction shown and described, as each groove has its own spring presser or holder, each blank or stick will be held in its groove independently of the others, and no variation in thickness in one of such blanks or sticks can effect the holding of the adjoining ones, as would be the case where spring-plates were used each adapted to press upon the contents of several grooves.

With our form of holding device there is a spring holding-finger to engage each blank or stick unaffected in any way by the contents of adjoining grooves, and each finger is free to adjust itself to hold the blank or stick in its respective groove, however such blank or stick may vary in shape or size from the others.

The carrier-chain sections, made up as shown and described, are linked together by link-plates $E^4$ $E^4$, attached to the outer plates E' E' of each section and extending rearward therefrom. Each of such link-plates has an opening $e^5$, through which the rear bar E of the section to which it is attached and the forward bar E of the next succeeding section project. The rear side of such opening where it engages the rear side of the forward bar of such succeeding section is curved, so as to present a convex face to the bar engaged by it, as shown in Figs. 18 and 20, the axes of the curvature being in a line parallel to the bars E E. The extreme forward portion of this curved face is at such distance from the forward side of the rear bar E of the section to which the plate $E^4$ is attached that when the connected sections are in the same plane the grooved faces of the rear bar of the forward section and the forward bar of the succeeding one will be at the same distance apart as are the opposite grooved faces of the middle bar E of either section. To allow the adjoining sections to change their angles with relation to each other as the carrier-chain is moved along through the machine and changes the direction of its travel, the upper and lower sides of those portions of the forward bars E of each section which are engaged by the link-plates $E^4$ $E^4$ of the preceding section are rounded off, as shown at $e^6$ in Figs. 18 and 20, so that said plates can rock easily on said portions of the bars, and the rear sides of the latter can rock upon the convex faces at the rear sides of the openings $e^5$ $e^5$ in the link-plates.

The pins $c'$ $c'$ on the disk $C^3$ on shaft $C^4$ and the cam-rib on disk $C^2$, hereinbefore described, are so arranged with relation to each other that at each time that the inclined portion of said rib engages one of the pins to turn the disk $C^3$ and shaft $C^4$ said shaft will be turned just far enough to cause the large toothed wheels D D and $D^5$ $D^5$, engaging the projecting ends of the bars E E E of the endless-chain carrier, to move the latter through a distance just equal to that between adjoining grooved faces on such bars. The portion of the carrier engaged by the toothed wheels is thus given a uniform step-by-step forward motion, and between each of such forward movements it is held stationary because of the engagement of the straight or circumferentially-extending portion of the rib $c$ on the disk $C^2$ with the pins $c'$ $c'$ on the disk $C^3$.

Just before the carrier-chain reaches the toothed driving-wheels $D^5$ $D^5$ on its way from wheels D D the ends of its bars engage and slide upon the horizontal guides F F on the plates F' F', attached to the sides of frame A A. The upright portions of these plates above the guiding and supporting ribs engage the outer faces of the opposite ends of bars E E E, so as to cause the carrier to move in a straight line and without any possibility of movement to one side or the other, thus insuring that the grooves in the successive bars E E E shall move in straight lines while passing the toothed wheels $D^5$ $D^5$, and that the corresponding grooves in the bars, as the latter are moved forward, shall at a certain point in the travel of the carrier be brought to stand directly over the points where the series of match sticks or blanks are fed up by the feed devices, to be described hereinafter.

Where the carrier-chain passes the toothed wheels D D, it is guided between vertical guides $F^2$ $F^2$, which are adapted to engage the opposite sides and ends of the bars E E E, so as to cause them to move in a straight line down past the toothed wheels and hold them in position to be properly engaged by the teeth of said wheels. These guides $F^2$ $F^2$ are continued up above the point where the wheels engage the carrier-chain bars, and the upper ends of the portions to engage the inner sides of such bars are beveled off to facilitate the passage of the bars between them and the parts to engage the outer sides of the bars. At and for a short distance below this point we provide springs $F^4$ $F^4$, adapted to bear against the outer sides of the bars E E E and prevent any forward jump or downward overthrow of the bars due to the step-by-step advance of the carrier-chain before they reach and are positively engaged by the teeth of the wheels D D. These springs by their friction on the bars which they press toward the rear or inner guiding-surface hold back each succeeding carrier-section, so that it does not tend to move toward the preceding one each time that the carrier comes to a stop after being moved forward through one step, but will remain at its proper distance from such preceding section. On the counter-shaft C' is a gear-wheel G, which meshes with another gear-wheel G', mounted on a stud or pin $g$ on the swinging plate $G^2$, pivoted upon shaft C'. This gear-wheel G' has an extended hub $g'$, upon which is mounted the pinion $G^3$, having on its inner side notches $g^2$ $g^2$, engaging lugs $g^3$ $g^3$ on the hub $g'$, so that the pinion and gear-wheel must rotate together. To hold the pinion in place on the hub $g'$, we provide the collar $g^4$, engaging the outer end of the pinion and fixed upon hub $g'$ by set-screw $g^5$. This arrangement makes possible the easy removal of the pinion and the substitution of another of different size, for a purpose to be explained hereinafter.

The pinion $G^3$ meshes with the gear-wheel $G^4$, which is fixed on the shaft of the lower one of the pair of rolls $G^5$ $G^5$, journaled in standards $G^6$ $G^6$, suitably supported from frame A A. These rolls, which are faced with rubber or other yielding material, are what we term the "drawing-rolls" for drawing the waxed cords or tapers $h$ $h$ from the supply-reel H to be rotatively supported in any desired way. The journal-boxes for their axles are held in vertical slots or ways $g^6$ in the standards $G^6$, so that they can be easily removed and put in place, and the upper roll will be free to move up and down with relation to the lower roll and to be pressed against it by its own gravity. Set-screws $g^7$ $g^7$, tapped through the caps $g^8$ $g^8$ on the tops of standards $G^6$, bear against the journal-boxes of the upper roll and can be used to force such boxes down to press the upper drawing-roll closer against the lower one. Meshing gears $G^8$ $G^8$ on the respective shafts of the two rolls cause the latter to rotate together as the gear-wheel $G^4$ is rotated by pinion $G^3$.

On the side of the pair of drawing-rolls which is toward the supply-reel H is the transverse plate H', attached to standards $G^6$ $G^6$ and having the series of small openings $h'$ $h'$, one for each cord or line of taper. These openings serve to guide the tapers and keep them separate from each other as they pass from the supply-reel to the drawing-rolls. The speed with which these rolls draw the tapers from the reel can be changed, as desired, by changing the pinion $G^3$ for one of a different diameter and different number of teeth. As the pinion is thus changed the plate $G^2$ is swung upon shaft C' to bring the substituted pinion properly in mesh with wheel $G^4$. As the diameter of the pinion is increased or diminished the plate is swung to bring the hub of wheel $G^4$, upon which the pinion is mounted, farther from or nearer to the teeth of said wheel. As thus swung to bring the pinion properly in mesh with the teeth of the gear-wheel it is fastened by the nut $g^9$ on the threaded pin $g^{10}$, attached to the plate $G^2$ and extending therefrom through a curved slot $g^{11}$ in a stationary plate $g^{12}$ on the frame A A. Such nut extends across slot $g^{11}$ and is adapted to engage the plate $g^{12}$ on opposite sides of the slot, so that as it is screwed in on pin $g^{10}$ it will clamp the plates firmly together and hold plate $G^2$ stationary at the point to which it has been adjusted. A lever $g^{13}$, attached to the nut, serves as a handle for screwing it in or out on the threaded pin.

With the construction described the drawing-rolls can be stopped at any time without stopping the rotation of counter-shaft C' if the nut $g^9$ be loosened by swinging the lever $g^{13}$ and the swinging plate $G^2$ be allowed to drop down, carrying the pinion $G^3$ out of mesh with gear-wheel $G^4$. When the rolls are to be started again, the plate $G^2$ can be swung up by handle $g^{14}$ until the pinion and gear-wheel $G^4$ are in mesh again, and the plate can be fixed by screwing the nut $g^9$ in again. From the drawing-rolls the lines of taper run inward and then upward, so as to leave a bend or slack portion, for a purpose to be described, and pass up between a series of pins I I, carried by the transverse bar I' on the frame A A. These pins serve to keep the lines of taper from getting tangled and guide them, properly separated, to the feed-rolls K K above, which have their axles journaled in suitable bearings on opposite sides of the frame. Of these feed-rolls the front one is of metal and has in its periphery a number of circumferential grooves $k$ $k$, one for each taper, while the rear one has its face made of elastic material, preferably rubber. The shafts of both rolls are geared together by the gears K' K', fixed upon them so that they must always turn together. The motion of these rolls is, unlike that of the drawing-rolls hereinbefore described, an intermittent one, and the slack or bend in the tapers after they leave the drawing-rolls is to allow for this difference between the movements of the two sets of rolls, so that with the drawing-rolls driven continuously there will always be enough slack in the tapers to allow the feed-rolls to feed forward the desired length each time that they move without straining the tapers between them and the drawing-rolls.

For giving the feed-rolls K K the desired step-by-step rotation sufficient to carry upward the desired lengths of taper to form the match blanks or sticks we provide the shaft of the grooved roll K with a ratchet-wheel $K^2$, engaged by a pawl $k'$, pivoted on lever $K^3$, which is pivoted on the shaft of the roll close to the ratchet-wheel. The arm of this lever opposite to that carrying the pawl is provided with a longitudinal slot $k^2$, through which passes a pin $k^3$, having the collar $k^4$ to engage the outer side of the slotted arm, the rectangular part $k^4$ fitting the slot $k^2$, the cylindrical part $k^6$ on the outer side of the collar and its end portions threaded to receive nuts $k^7$ $k^7$. The nut on the inner threaded end of the pin engages the inner side of the slotted lever-arm, and when screwed up clamps such arm between it and the collar $k^4$, so as to fasten the pin firmly to the arm at any desired point of adjustment along slot $k^2$.

A link $K^4$, having its upper end provided with an eye or opening engaging the cylindrical part $k^6$ of pin $k^3$, has its lower end pivotally connected with one arm of a lever $K^5$, pivoted to the frame A A at $k^8$. The opposite arm of such lever is pivotally connected with the rod $K^6$, which is at its lower end attached to the eccentric-strap $K^7$, engaging the eccentric $K^8$ on the shaft B. With this construction the pawl-carrying lever $K^3$ will, as the shaft B revolves, be swung to cause its pawl $k'$ to move the ratchet-wheel $K^2$ and turn the feed-rolls a certain distance for each full turn of the shaft.

The amount of throw of the pawl-lever, and so the extent of each forward taper-feeding movement of the feed-rolls, can be changed, as desired, by setting the pin $k^3$ farther toward or from the center of oscillation of the lever.

Upon the outer end of the shaft of the front feed-roll is the hand-wheel $K^9$ to enable the feed-rolls to be turned forward by hand when desired—as, for instance, when, at the beginning of the operation of the machine, the tapers are being inserted in place and are to be drawn up between the feed-rolls, so as to give the latter a good firm hold on them. The grooves $k$ $k$ are formed so as to receive and fit the lines of taper closely, so that with the rubber face of the rear roll engaging and pressing against their outer sides such lines of taper will be gripped firmly and securely and without any possibility of slip, and each forward motion of the rolls will positively feed up a length of taper exactly proportionate to the extent of movement of the rolls. With this construction the length of taper fed forward by each step-by-step rotation of the rolls can be easily adjusted, as desired, by adjustment of the pin $k^3$ along the arm of lever $K^3$ in the manner hereinbefore indicated.

Attached to the frame A A below the forward grooved feed-roll is a transverse bar L, having in it a series of holes, one for each groove $k$, in which are held pins $l$ $l$, with abrupt upper ends extending upward and outward at an angle into the grooves $k$ $k$, so as to clear from the latter, as the grooved roll revolves, any particles of wax remaining in them. Set-screws $l'$ $l'$, tapped through a portion of the bar L and engaging the pins $l$ $l$, serve to hold the latter firmly in place. Upon loosening these screws the pins can be adjusted, as required, to compensate for wear.

To remove any adhering particles of wax from the face of the grooved roll between the grooves $k$ $k$, we provide the scraper-plate L', having its edge held closely against the roll periphery, as shown in Fig. 7.

Above the feed-rolls K K is a transverse plate M, bolted at its ends to the frame A A and having directly over the line of contact of the rolls a series of vertical openings, one for each groove $k$ in the grooved roll, and fixed in these openings are the tubes $m\ m$, preferably of brass, in position to receive the tapers fed upward by the feed-rolls. The bores of these tubes, which are small enough to hold and steady the tapers, while leaving them free to be moved easily upward, are made flaring at their lower ends, as shown in Fig. 7. At the upper ends of these tubes the plate M is provided with a longitudinally-extending recess or groove $m'$, in which is held the steel plate $m^2$, provided with the openings $m^3$, forming continuations of the bores of the tubes $m\ m$. This perforated plate $m^2$ can be held down in the groove $m'$ in any desired way, as by screws, one of which is shown at $m^4$ tapped into plate M beyond the series of openings $m^3\ m^3$. Such openings, having their upper edges in a plane at right angles to their axes and parallel with the upper face of the plate, are of such size and shape as to fit the tapers very closely and serve to support the latter during the cutting operation to be described, so that the end of each taper, after a piece has been cut off, will be kept perfect in shape and without any enlargement or distortion. The upper face of plate $m^2$ is flush with that of the main part of plate M, which, extending forward from the groove $m'$, has resting upon it the plate M', provided in its under side with the series of rectangular grooves $m^5\ m^5$, one for each opening $m^3\ m^3$ in plate $m^2$, each groove being in line with its respective opening $m^3$ and extending across the plate M' from front to rear thereof. This latter plate is firmly screwed to plate M in any desired way, as by screws $m^6\ m^6$.

The cutter-bars $m^7\ m^7$, fitting and sliding in grooves $m^5\ m^5$ and supported upon the upper faces of plates M and $m^2$, have their forward ends provided with cutting edges $m^8\ m^8$, adapted to slide over the upper ends of openings $m^3\ m^3$, so as to cut off any tapers projecting above the latter, the cut being so close to the edges of the openings as to leave the ends of the tapers below the cut flush with such edges.

The ends of the cutter-bars $m^7\ m^7$, projecting beyond the front side of plates M and M', are attached to a reciprocating transverse head $M^2$, which is supported and guided in its reciprocations on the guide-plates $m^9\ m^9$, attached to and extending forward from the plate M. This head consists of a body formed of a flat bar having in its upper side a series of grooves $m^{10}\ m^{10}$ to receive the shanks of the cutter-bars, and a cap-plate $m^{11}$, fastened down upon the top of such bar by screws $m^{12}\ m^{12}$.

Pins $m^{13}\ m^{13}$, passing up through openings in both bar and cap-plate and in the cutter-bars, serve to hold the latter longitudinally in place in grooves $m^{10}\ m^{10}$. To keep such pins up in place we provide another plate $m^{14}$, which, engaging the lower ends of the pins, is removably clamped to the under side of the grooved bar by means of the screws $m^{15}\ m^{15}$, preferably provided with heads by which they can be readily unscrewed at any time to allow any one of the pins $m^{13}$ to be removed to release the respective cutter-bar which it may be desirable to remove either for sharpening or for the substitution of a new bar.

In order that the forward cutting end of each cutter-bar may be independently held down to its work, so as to shear closely over the upper edge of the respective openings $m^3$ in plate $m^2$, and may be caused to always cut the taper flush with such edges, we provide separate pressure devices for the separate cutters, which, engaging the forward portions of the latter, act to force them down into close contact with the upper surface of plate $m^2$. These pressure devices, as shown, consist of springs $m^{16}\ m^{16}$, one for each cutter-bar, fastened near their rear ends to the top of plate M' by means of screws $m^{17}\ m^{17}$, and having their forward ends pressing down upon the rounded tops of vertically-movable plugs $m^{18}\ m^{18}$, which are guided in holes $m^{19}\ m^{19}$ in plate M', and have their lower ends preferably flat, engaging the upper sides of the cutter-bars, as shown in Figs. 7 and 13. With this construction, involving individual and separate pressure devices for the different cutter-bars, we have found that it is possible to secure such uniform and regular cutting as it is not possible to make sure of where the pressure devices are not employed or where a single cutter-blade adapted to slide over a number of the taper-holding openings $m^3$ in plate $m^2$ is used.

Without spring or other yielding means acting upon the different cutter-bars to hold their cutting ends down in proper position against the surface of bar $m^2$, surrounding the edges of the openings $m^3\ m^3$, any wear of the under sides of the cutter-bars at or near their cutting edges will cause the cut to be defective, so that the cut ends of the taper will be deformed and not flush with the upper edge of the respective openings $m^3\ m^3$.

The pressure devices shown can be made strong enough to spring the forward ends of the cutter-bars slightly downward, so as to take up or compensate completely for the wear between such bars and the face of plate $m^2$ during the operation of the machine.

With the construction described, the openings $m^3\ m^3$ being made round to fit the round taper ends and the feed-rolls K K being arranged to feed the tapers forward up through the tubes $m\ m$ and the openings $m^3\ m^3$ before each reciprocation of the cutter-bar-carrying head inward toward such openings, a series of portions of the tapers, of suitable length to form the sticks or bodies of the desired matches, will be cut off at each inward movement of the cutters, and the ends of the tapers below the cuts will be kept perfectly round and undeformed, so as to be in the best condition for insertion in the grooves $e\ e$ of the carrier-chain hereinbefore described. The length of the portions of taper thus cut off will of course depend upon the extent of each movement of the feed-rolls, which is regulated in the manner hereinbefore indicated by adjustment of the pin $k^3$ in or out on the arm of the pawl-carrying lever $K^3$, so as to cause the link $K^4$ to give such lever a greater or less swing to turn the ratchet-wheel more or less each time that the pawl $k'$ is carried forward by the lever. The head $M^2$ is reciprocated by the links N N, which at one end are pivoted upon the pins $N'$ on opposite ends of the bar forming the main part or body of the head, while their other ends are pivotally connected with the arms $N^2 N^2$, fixed on the rock-shaft $N^3$, pivoted in bearings $n$ $n$ on the frame A A. At one end this shaft has fixed to it the rearwardly-extending arm $N^4$, which is pivotally connected with the upper end of the reciprocating bar $N^5$, rigidly connected at its lower end, as shown best in Fig. 4, with another bar $N^6$, whose lower portion is guided in a guide $N^7$, attached to or forming part of the cap $N^8$ of the journal-bearing for shaft B, and carries on a stud $N^9$ on its lower end a roller $N^{10}$, engaging a cam-groove $N^{11}$ in the side of the cam-disk $N^{12}$, fixed upon and rotating with shaft B. Such cam-groove is shaped so as to draw the bars $N^5$ $N^6$ downward to rock the shaft $N^3$ to move the cutter-head inward, carrying the cutters over the taper-supporting openings $m^3$ $m^3$ in bar $m^2$ just after each forward rotation of the feed-rolls.

While we prefer to make the cutting edges of the cutter-bars chisel-shaped and in a straight line at right angles to the respective bars, as shown in Figs. 8 and 9, we contemplate giving them a different shape, if desired. In Fig. 10 a portion of one of the cutter-bars is shown with its forward end provided with a half-round concavity having a cutting edge extending around it, while in Fig. 11 there is shown a portion of a cutter-bar having an edge in straight line inclined at less than a right angle to the direction of travel of the cutter-bar, so as to get a shearing cut of the taper.

The scraper-plate $L'$, hereinbefore described, for keeping the outer periphery of the grooved feed-roll clear of wax, is supported at its ends on the pendent arms $l^2$ $l^2$, extending down from the plates $m^9$ $m^9$, which support and guide the cutter-head.

The toothed wheels $D^5$ $D^5$, which engage the projecting ends of the bars E E E of the sections of the endless carrier-chain so as to move the latter rearward over the horizontal guides F F, are situated so as to engage and hold the bars firmly down on said guides as they are successively brought into position with their series of grooves $e$ $e$ over the series of taper holding and guiding openings $m^3$ $m^3$ in plate $m^2$, so that the tapers fed up through such openings by the feed-rolls will pass up into said grooves and over the faces of the spring-fingers $e^4$ $e^4$ for the respective grooves. The hereinbefore-described mechanism for giving these wheels and the others D D a step-by-step movement of rotation is so timed and arranged that as the carrier is moved forward the grooved faces of the bars E E will be successively brought to their taper-receiving position and held there until the said wheels D D and $D^5$ $D^5$ are rotated forward another step.

For opening the match blank or stick holding devices of the carrier so that the lengths of taper fed up by the feed-rolls as the carrier comes to rest may pass freely up into the series of grooves in a carrier-bar E, brought up into receiving position by the movement of the carrier, we provide the vertically-reciprocating opener-comb, consisting of a hollow head O, surrounding the shaft $D^4$, but having its interior cavity made larger than the latter, so as to allow of up-and-down and forward-and-back movement of such head with relation to the shaft, and the series of thin, flat fingers $o$ $o$ for engaging the spring-fingers $e^4$, attached to and extending down from the lower side of the head. This head is at its opposite ends guided between the two vertical guides $o'$ $o'$ on the plates $O'$ $O'$, provided with horizontal portions supported and sliding upon the hubs $d$ $d$ of wheels $D^5$ $D^5$. To thus embrace the respective wheel-hubs each plate is provided with an open-sided opening, as shown in Fig. 7. Each plate thus formed is attached to the forward end of a bar $O^2$, which at its rear end is forked to embrace and be guided in its forward-and-back movements on the shaft $O^3$, journaled in bearings $o^2$ $o^2$, situated on the rear portion of frame A A. This shaft carries a sprocket-wheel $O^4$, which is driven by a sprocket-chain $O^5$, engaging sprocket-wheel $O^6$, fixed on shaft $O^7$, journaled in bearings on the lower part of the frame. Also fixed on the latter shaft is the gear-wheel $O^8$, which meshes with and is driven by the pinion $O^9$, which is journaled in a bearing $o^3$ on the frame and rotates with the gear-wheel $O^{10}$, which meshes with and is driven by the gear-wheel $B^3$, mounted on and rotating with the hub of cam-carrying wheel $B'$. The shaft $O^3$ has fixed upon it, close to the fork of each bar $O^2$, a cam-wheel $O^{11}$, engaging a roller $o^4$, carried by the bar. Springs $o^5$ $o^5$, attached at one end to the frame A A and at the other to the respective bars $O^2$ $O^2$, serve to draw the latter longitudinally rearward when the portions of the cams of smaller diameter come opposite the rollers $o^4$ $o^4$ as the shaft $O^3$ revolves. The engagement of the cam portions of greater diameter with the rollers $o^4$ $o^4$ will cause the bars $O^2$ $O^2$ to move longitudinally toward the front of the machine a short distance, and the springs will draw them back again when such higher portions of the cam pass. Short forward-and-back reciprocations of the plates $O'$ $O'$, attached to the bars $O^2$ $O^2$, and of the head O, guided on such plates, will thus be caused each time that the shaft $O^3$ turns through one full revolution.

For moving the opener-comb head vertically to cause its fingers $o\ o$ to engage a series of the spring-fingers $e^4\ e^4$ and force them back from the adjoining grooved face of the respective bar E of the endless-chain carrier, so as to leave a free path for the passage of tapers up in the grooves in such face, and then to raise the head, so as to let the spring holding-fingers move into position to hold the tapers in the grooves, we provide a transverse rock-shaft P, journaled in bearings on the frame and having the two arms $P'\ P'$ connected with the head O by means of links $P^2\ P^2$. On one end of this rock-shaft is the arm $P^3$, pivotally connected with the upper end of bar $P^4$, having its lower portion guided in a guide $P^5$, which, like guide $N^7$, hereinbefore described, is attached to or forms part of the cap $N^8$ of the journal-bearing of shaft B which is nearest to the cam-carrying wheel $B'$. A roller $p$, journaled on a pin $p'$ on this bar, engages the face of cam $B^2$, fixed upon and rotating with shaft B. Two springs $p^2$ and $p^3$, the former attached at one end to the arm $P^3$ and at the other to the frame A A, and the latter attached at one end to the frame and at the other to bar $P^4$, serve to keep the roller $p$ down against the cam and move the bar $P^4$ down and rock the shaft P to move the opener-comb down into position to force the spring-fingers $e^4\ e^4$ back from the adjoining grooved face of a carrier-bar when the lower portion of the cam-periphery comes to and is passing under the roller $p$. The higher and lower portions of this cam are so arranged relatively and are of such extent that the forward end of the lower portion is brought, by the rotation of shaft B, around under roller $p$, so that the bar $P^4$ and arm $P^3$ are thrown down quickly by springs $p^3$ and $p^2$ just after the carrier-chain has been moved forward a step and brought to rest with a series of its spring-fingers $e^4\ e^4$ in position to be engaged and pressed back by fingers $o\ o$ of the opener-comb. By the rocking of shaft P caused by this descent of bar $P^4$ and arm $P^3$ the head O is forced down to cause its fingers to pass over the faces of the spring-fingers $e^4\ e^4$, so as to bend the latter back, away from the adjoining grooved bar-face of the carrier. The opener-comb stays down, so as to keep the fingers $e^4\ e^4$ pressed back until, by the action of the feed-rolls, the tapers are being fed up into grooves $e\ e$. The roller $p$ is then cammed upward by the inclined part of cam $B^2$, which connects the lower with the higher part of the cam-periphery, so that the fingers $o\ o$ of the opener-comb are raised up out of engagement with the spring holding-fingers $e^4\ e^4$, allowing the latter to spring against the tapers to hold the latter in the grooves $e\ e$.

The cam $B^2$ is so timed with relation to the cam-disk $N^{12}$, which actuates the cutter-bar-carrying head, that the opener-comb is disengaged from the spring holding-fingers before the cutters cut the tapers, as hereinbefore described. The spring-fingers $e^4\ e^4$ will then clamp and hold the cut-off portions of the tapers securely in the grooves $e\ e$ of the respective bar E of the endless-chain carrier.

The comb-fingers are arranged on the head O so that there are spaces between them, which, when the comb is down, come opposite the taper-receiving grooves $e\ e$, so that the comb-fingers do not interfere with the free upward passage of the tapers from below into such grooves.

To accommodate the plates $E'\ E'$ of the carrier-sections, certain ones of the comb-fingers are divided, as shown at $o^6\ o^6$ in Fig. 12, while the extreme outer ones of such fingers are made narrower than the rest, so as to pass down in the spaces between the outer plates $E'\ E'$ and the adjoining grooves $e\ e$ without overlapping the latter. As the adjoining grooved faces of the bars E E are always the same distance apart in the carrier, but are on opposite sides of their respective bars, and the fingers $o\ o$ of the opener-comb have to pass successively down in front of one grooved face and behind the next one, the successive downward movements of the opener cannot be in the same plane, but must be in different planes. The forward-and-back reciprocation of the plates $O'\ O'$, by the action of the cams $O^{11}\ O^{11}$ and the springs $o^5\ o^5$ upon the bars $O^2\ O^2$, hereinbefore described, provides for this required change of plane for the successive opening movements of the comb. Such cams are formed so that the plates, and consequently the head O, guided therein, will be moved slightly forward just before the opener-comb is to act on the spring-fingers engaging the rear face of that one of the three bars E E E of a carrier-section which is the front one with relation to the travel of the carrier, and rearward again before the comb is to pass down over the front face of the middle bar E.

To enable the comb to pass down subsequently by the rear face of the middle bar and the front face of the rear bar, respectively, the head is first moved forward by the action of the springs $o^5\ o^5$, when the lower parts of the cams $O^{11}\ O^{11}$ come around to rollers $o^4\ o^4$, and then rearward by the higher parts of the cam. The higher and lower faces of cams $O^{11}\ O^{11}$ are made concentric, so that the plates $O'\ O'$, which guide the opener-comb head O, will be held stationary while the head is descending and rising again to be engaged with and disengaged from the spring-holding fingers of the carrier.

In order to raise and hold the opener-comb up, out of operative position, when the lever $B^6$ is swung out to unclutch the cam-carrying wheel $B'$ and the gear-wheel $B^3$ from the disk $B^2$, fixed on shaft B, we pivot to such lever at R a link $R'$, connected with the lower end of lever $R^2$, which has pivotally connected with it the outer end of the short cam-bar $R^3$, which has its inner portion supported and guided in a suitable way on frame A A. Such bar has the upwardly and inwardly inclined cam-face $r$, which, as the bar is drawn out by the outward unclutching swing of the lever B⁶, rides under a lug or arm $r'$ on the bar P⁴, so as to cam the latter upward against the stress of springs $p^2 p^3$, so that the opener-comb is lifted, to take its opening-fingers well above the upper side of the sections of the endless carrier-chain, and held, so that there is no possibility of its being lowered into position to interfere with the forward movement of the carrier, should the shaft B, with its cam B², when unclutched from the cam-carrying wheel B', be turned so as to bring the lower part of such cam under the roller $p$ on the bar P⁴.

The discharging device for pushing the completed matches out of the endless-chain carrier before the latter comes around again to the described taper cutting and sticking mechanism consists of a reciprocating head S, carrying in its forward side a series of projecting punches $s\ s$, one for each of the grooves $e\ e$ in the bars E E of the carrier, situated so that as the head is moved toward the front of the machine said punches will engage the inner ends of the series of matches held in the grooves of one of the bars and push such matches outward clear of the carrier. This head, with its punches arranged so as to operate upon the grooves of each bar while the latter is held stationary in the upright guides by the engagement of the toothed wheels D D with the bar ends, as hereinbefore described, is constructed like that shown and described in our United States Patent No. 528,457. It consists of the body having its rear side provided with a longitudinal groove or recess to accommodate the shaft C⁷, which carries the toothed wheels D D, such body being carried by the two plates S' S', which are guided in suitable guides on the frame A A, which are to hold such plates securely against movement in any but a straight line forward and back with reference to the carrier-chain.

The front of the body of the head is provided, as shown, with the forwardly-projecting flange $s'$, having the upwardly-projecting longitudinal rib $s^2$. Supported upon this flange and having a rabbet $s^3$ to receive rib $s^2$ is the bar S², having a series of holes through which the punches $s\ s$ project, and at its back the longitudinal groove $s^4$, which receives the heads $s^5 s^5$ of the punches. A plate S³, having a portion extending down behind the bar S² to form a backer for the heads $s^5 s^5$, engages the upper side of bar S² and has a lip or rib $s^6$, engaging the rabbet in such bar, so as to hold the latter securely in place on the reciprocating head. Clips $s^7 s^7$, bolted to the plates S' S', engage the upper side of plate S³ and have lips $s^8 s^8$, engaging a portion of the forward side of the plate, so as to secure the latter firmly in place.

For actuating the punch-carrying head to drive it forward to discharge the matches from a series of grooves $e\ e$ each time that the carrier-chain comes to rest, we provide the connecting-rods T T, attached at their forward ends to the plates S' S' and at their rear ends pivotally connected with the arms T' T' on the rock-shaft T². A crank-arm T³ on the outer end of this shaft is actuated by a connecting-rod T⁴, pivotally connected at its upper and lower ends, respectively, with such crank-arm, and a second crank-arm T⁵, attached to the short rock-shaft T⁶, journaled in the lower part of frame A A to the rear of the main cam-carrying wheel B'. An arm T⁷, rigidly attached to this rock-shaft, projects forward therefrom, close to the outer face of such wheel B', and carries a roller $t$, engaging the cam-groove $b$ on the wheel, arranged to move the roller-carrying arm down just after the carrier-chain comes to rest at the end of each of its step-by-step advances. This movement of arm T⁷ causes, through the described connections, a forward swing of arms T' T', so as to advance the punch-carrying head for the described discharging operation. The part of cam-groove $b$ which is the farther from the center of the wheel B' then engages the roller $t$ to raise arm T⁷ again and retract the head S.

With the extent of the step-by-step forward rotation of the feed-rolls made adjustable in the manner hereinbefore indicated, our machine is adapted to make matches of different lengths, as desired.

Whatever the length of the match may be, it is desirable, in order that the heads may be properly applied by the composition-applying mechanism, that the match blanks or sticks shall always project the same distance beyond the under or outer face of the carrier-chain. As the feed devices are adjusted to feed longer portions of the tapers above the cutters, said tapers will simply pass farther through the grooves $e\ e$ in the bars E E and project more above the upper sides of such bars. For the proper engagement of the punches with the rear ends of the matches made from these longer blanks, it will then be necessary to move them outward in the grooves before they come around to the discharging-punches. For this purpose we provide the pusher-plate U, situated to the rear of the vertical portion of the carrier-chain above the punch-carrying head S, and attached to the forward ends of plates $u\ u$, which have their rear ends secured to the uprights U' U' on the plates S' S' forming the carriage for the head S. This pusher-plate, which moves forward with each discharging motion of such head, is cut away at $u'\ u'$ to enable it to pass the plates E' E' of the carrier-chain sections, and has its forward edge adapted to engage the projecting rear ends of any match-sticks and push them outward until they are flush with the back or inner side of the respective bar E, or can pass the front ends of the retracted punches on their way down into position in front of the latter before they are punched from the carrier. With this construction, where the blanks or sticks cut off and inserted in the carrier are long enough to project beyond the inner ends of grooves $e\ e$, those in each series of grooves will be engaged and driven forward to get them ready for the punches while the latter are discharging the matches from one of the preceding rows of grooves.

Whenever the length of the match-sticks is changed by the adjustment of the pin connection between link $K^4$ and pawl-lever $K^3$, in the manner hereinbefore set forth, the removable pinion $G^3$ is to be replaced by another of the required size and number of teeth to change the rate at which the drawing-rolls $G^5$ draw the tapers from the supply-reel, to keep enough slack in the tapers between such rolls and the feed-rolls to furnish the required length of taper to be fed forward at each motion of the feed-rolls, without danger of any strain on the taper between the two pairs of rolls. With the drawing-rolls rotating continuously the tapers are drawn off easily and smoothly from the supply-reel and are not subjected to the injurious jerking or sudden pulling on the tapers, such as would take place were the tapers led directly to the intermittently-acting feed devices and the latter relied upon to draw the tapers from the supply-reel.

The pull on the tapers, which causes the reel to revolve and let said tapers be unrolled from it, is a uniformly continuous one, which takes off the tapers in the easiest and best way without marring or straining them, while the intermittent rotation of the feed-rolls merely causes a taking up of some of the slack existing in the tapers between such rolls and the drawing-rolls without any strain whatever on the tapers as they pass to the feed-rolls, and consequently without any interference with the forward feed of the tapers, due to back pull on the latter, or any resistance to their forward travel with the engaging surfaces of the feed devices.

The feed of the tapers up into the grooves of the bars of the endless carrier will be positive, and for any adjustment of the throw of the pawl-lever $k^3$ will continue exactly the same, corresponding precisely in extent with the forward travel of the taper-gripping surfaces of the two feed-rolls, since in the absence of back pull or strain on the tapers there will be no danger of slip of the latter in the grasp of such rolls constructed as shown and described. After passing the described mechanism for inserting the tapers in the grooves $e\ e$ of bars E E and cutting off the portions to form the match bodies or sticks, the endless carrier-chain passes onward from the rear of the main part of the machine to the composition-applying device V for putting the heads on the sticks. Such device is constructed and operates like the one fully shown and described in our previous United States Patent, No. 528,457, and need not, therefore, be described or shown in detail in the present case. For a full explanation of its construction and working and of the connections whereby it is driven continuously from the sprocket-wheel $V'$ on shaft $O^7$, journaled in the lower portion of the rear side of the main frame, we would refer to the drawings and specification of such patent. As in the machine shown and described in the latter, there are continuously-driven toothed wheels to engage and move the carrier just before it reaches the composition-applying roll. Such wheels, one of which is shown at $V^2$ in the drawings of the present case, are, like wheels D D and $D^5\ D^5$, provided with teeth to engage the projecting ends of bars E E E of the carrier-sections.

To allow for the change from the step-by-step movement of the carrier past the sticking, cutting, and punching devices of the main part of the machine to the continuous movement past the composition-applying mechanism, a slack part is left in the carrier, such part being guided forward over the curved supporting-guide $V^3$. After leaving the composition-roll the carrier passes up over guide-wheels at $V^4$, and thence forward under and up over larger guiding and supporting wheels at $V^5$. From the latter wheels it travels to and over the sector-shaped guide $V^6$ and alternately under and over a series of guiding and supporting wheels, as indicated at $V^7\ V^7\ V^7$, all of which, like those indicated at $V^5$, are supported in suitable bearings $v\ v$ on the uprights $V^8\ V^8$, so as to be free to rotate easily. These wheels are engaged by the ends of the bars E E E of the carrier-sections, so that such sections ride easily over and under them, the end plates $E'\ E'$ of such sections serving, by engaging the inner sides of the wheel-rims, to keep such sections moving in a straight line. After leaving the last or outer pair of these wheels $V^7\ V^7$ the carrier-chain passes forward over guides (indicated at $V^9$) toward the front of the machine. Above such guides, so as to assist the cooling and drying of the upturned heads of the matches carried by the carrier, is the swinging fan $V^{10}$, supported in the same manner as that set forth in our patent above referred to, and driven in the same way by a pitman-rod (designated in the present case by $V^{11}$) connected at one end with crank-arm $V^{12}$ on shaft $V^{13}$ of the fan and at the other to crank-arm $V^{14}$ on shaft $V^{15}$ of sprocket-wheel $V^{16}$, driven by chain $V^{17}$ from sprocket-wheel $V^{18}$ on the same shaft with the sprocket-wheel for driving the composition-device-actuating gearing. At the forward end of guides $V^9$ the carrier-chain is engaged by another pair of continuously-rotating toothed wheels, of which one is shown at $V^{19}$. These toothed wheels, adapted to engage the projecting ends of the bars E E E of the carrier, are fixed on the same shaft $V^{20}$ with the sprocket-wheel $V^{21}$, which is driven by sprocket-chain $V^{22}$, running around a sprocket-wheel fast on the rotating shaft of the gearing for driving the composition-applying devices. After leaving these toothed wheels $V^{19}$, which aid the ones engaging the carrier-chain just before the latter reaches the composition-applying roll in keeping up a uniform continuous movement of the carrier-chain after it has passed beyond the sticking and cutting devices, and before it reaches the match-discharging punches, the carrier passes downward and forward, so as to leave a downwardly-bent or slack portion to and over a pair of guide-wheels, of which one is shown at $V^{28}$, and thence goes down between the upright guides to the intermittently-rotating toothed wheels D D, which with wheels $D^5 D^5$ give the part of the carrier engaged by and extending between them the step-by-step motion, as and for the purpose hereinbefore set forth.

The change from the continuous movement of wheels $V^{19} V^{19}$ to the step-by-step advance of wheels D D is allowed for by the slack in the carrier between such pairs of wheels, there always being enough of said slack to prevent undue strain as the wheels D D move forward. The matches, as punched out from the holding devices of the carrier-chain, can be received in any desired form of trough, box, or receptacle, while we prefer to use to receive them the delivery-apron W, to be driven like that shown and described in our patent hereinbefore referred to, and driven in the same way, so as to take each row of matches discharged upon it by the punches and deliver such rows separately into the trough W', whose bottom is formed of a traveling belt $W^2$ to convey the matches to and fro toward the discharge end of the trough.

The manner of and means for driving the apron and belt need not be described or set forth more at length herein, as they form no part of our present invention, but are set forth fully in the aforesaid patent.

For rotating the cam-carrying main wheel B' any kind of gearing connecting it with some motor or source of power can be used; but we prefer to employ the belt X, to be driven from another belt-wheel rotated by some motor. Another belt X', similarly driven, can be applied to the other wheel B', which is fixed on shaft B; but where both belts are employed to apply driving-power to both wheels B' B' there should be means for stopping the application of rotating power to that wheel B' which is fast on shaft B, while leaving the other wheel B' in continued rotation. For this purpose the connections between the wheel which drives the belt running around the wheel B', fast on shaft B, could be such that the former wheel might be disconnected at will from the rotary device driving it.

Any of the well-known clutch mechanisms could be used for the desired connection and disconnection of wheel and motor.

The object of the construction just above indicated is to make it possible, when the machine is in full operation, to apply rotating power to the wheels B' B' on both ends of the shaft B, and to run one of such wheels—the one carrying the cam and clutch-pins—continuously after the shaft B has been stopped. The special purpose of this continued running of such wheel while the shaft is not rotating will be set forth fully hereinafter.

The operation of our invention, which will be understood from the foregoing description and the drawings, is, briefly, as follows: With the supply-reel provided with the required number of lines or strips of taper, and the latter led inward between the drawing-rolls and then upward into the grasp of the feed-rolls, with sufficient slack in them between the two sets of rolls to provide enough length of taper for the forward feed of the latter by the first movement of the feed-rolls, the lever $B^6$, thrown inward to clutch the cam-carrying wheel B' to the cam-disks $B^2$, fixed on shaft B, and the endless carrier at rest, with a line of its taper-holding grooves immediately over the guiding and supporting openings, through which the tapers are passed upward from the feed-rolls, the movement of such rolls will feed the tapers up into the grooves of the carrier past the spring-holding fingers, which are held retracted by the fingers of the opener-comb. Such comb is then raised to allow the spring-fingers to grip the tapers in the carrier-grooves, and immediately after this gripping the cutter-bars are actuated to cut the tapers close to the plane of the upper edges of the guiding and supporting openings $m^3 m^3$, so that the ends of the tapers remaining in such openings are flush with the edges of the latter and are kept in shape by the inclosing part of the openings. The carrier is then moved onward one step to carry the match-sticks, cut off from the tapers and held by the grooves and spring-fingers of the carrier, toward the composition-applying mechanism, where the heads of ignitable material are put on them. This movement of the carrier brings the next row of grooves e e over the tapers gripped by the feed-rolls. The opener-comb then descends to press the spring-holding fingers back from this row of grooves, and the next step-by-step movement of the feed-rolls feeds the taper up into the carrier-grooves, as before, this feeding being followed by the raising of the opener-comb to release the spring-holding fingers and the cutting off of the fed-up portions of the tapers in the manner just above described. While this operation is going on and the feed-rolls are rotating intermittently to feed up successively the lengths of taper required to make the match-sticks of the desired length, the drawing-rolls are rotating continuously and slowly, so as to draw the tapers from the reel with a steady gentle pull adapted to unroll them from the reel without any strain or jerk to injure them. The rate of this continuous rotation of the drawing-rolls is such, with relation to the rate of travel of the taper-gripping faces of the feed-rolls, that there will always be before each step-by-step rotation of the latter rolls enough slack to accommodate the forward feed of the tapers by the subsequent movement of the feed-rolls without straining or pull upon the parts of the tapers engaged by the drawing-rolls.

The rate of feed of the tapers by the feed-rolls is readily adjusted to produce different lengths of match-sticks, as desired, by adjustment of the pin connection between the pawl-lever $K^3$ and the actuating-link $K^4$ along the slot in the lever, so as to bring such connection nearer to or farther from the center of oscillation of the lever, and so increase or diminish the throw of the pawl-carrying end of the lever, while the movements of the link, actuated by the mechanism hereinbefore described connected with the main shaft B, remain the same. As the feed of the tapers is thus changed, the rate of rotation of the drawing-rolls is correspondingly altered, so as to provide the required amount of slack in the tapers between themselves and the feed-rolls before each forward rotation of the latter. As indicated hereinbefore, this alteration of the rate of rotation of the drawing-rolls is readily secured by changing the pinion $G^3$ for one having the different number of teeth required to rotate gear-wheel $G^4$ at the desired speed, the swinging frame $G^2$ being adjusted accordingly, to bring the new pinion properly in mesh with such gear-wheel. As the match-sticks are made longer, by increasing the extent of the steps of rotation of the feed-rolls, more of such sticks will project up beyond the grooves of the carrier, but the portions of them which extend below the under side of the carrier are always of the same length, so that they will be always presented properly and uniformly to the composition-applying mechanism as they are brought thereto by the continued step-by-step advance of the carrier. From the composition-applying device the carrier passes up over the small guide-wheels and thence to and up over the first large guide-wheels and to the segment-shaped guide. Thence it passes over and under the series of large guide-wheels to give the match-heads some time to cool and dry. After leaving these wheels the carrier passes under the swinging fan, which serves to hasten the cooling and drying of the heads, so that when the matches reach the discharging-punches their heads can be cool and dry enough to be sufficiently hard to allow of boxing.

Where the machine is adjusted in the manner above described for making the long matches, when the latter are long enough to project, at their inner ends, too far beyond the carrier to pass properly down in front of the discharging-punches, the reciprocating pusher-plate will engage successive rows of them before they reach the punches and push them outward to bring their ends into proper positions for being engaged by the ends of the punches.

The pins forming the punches will serve to clear out any adhering particles of wax from grooves $e\ e$, so as to leave the latter clean and clear for the reception of new lengths of taper, while the flat fingers of the opener-comb, as they pass down over the faces of the base E E, which are between such grooves, will serve to keep them and the opposing faces of the spring-holding fingers clear of any particles which might tend to adhere to them.

When the machine has been in operation and it is desired to stop it, it is desirable to first discontinue the insertion of new sticks into the carrier and to run those already in the latter through the machine and discharge the completed matches. For this purpose the clutch-lever $B^6$ is swung out to disconnect the cam-carrying wheel $B^7$, and the gear $B^3$ rotating therewith, from the shaft B. At the same time the connection between the other wheel B' and the driving-motor therefor should be shifted, so that the shaft can come to rest, while the former wheel B' and gear $B^3$ continue to rotate. The swinging frame $G^2$ is also unlocked and swung down to take the pinion $G^3$ out of mesh with the gear $G^4$. This will stop the rotation of the drawing-rolls, that of the feed-rolls and of the cutting devices having been stopped by the stoppage of the shaft B, by which they are driven through the connecting mechanisms hereinbefore described.

The devices for moving the carrier-chain and for actuating the composition-applying mechanism, the fan, the pusher-plate, the discharging-punches, and the horizontally-sliding plates, in which the opener-comb head reciprocates, continue in operation, because they are driven, through the described connections, from the cam-carrying wheel B' and the gear $B^3$, which continue to rotate with such wheel, the latter being driven by belt X. The opener-comb, while it continues to be moved back and forth horizontally above the carrier, is now held up out of operative position, so that it cannot pass down into contact with the spring-holding fingers of the carrier by the engagement of the cam-bar $R^3$ with the lug or arm $r'$ on the bar $P^4$. Such cam-bar, as it is drawn out by the outward swing of the lever $R^2$, connected with clutch-lever $B^6$, cams bar $P^4$ upward against the stress of springs $p^2$ and $p^3$, so as to lift the roller $p$ from cam-disk $B^2$, and then keeps such bar raised to hold arms P' P', and consequently the opener-comb head, in elevated position, with the opener-fingers well above the carrier. With the clutch-lever in its outward position the described operation of parts of the machine will go on, so that all the contents of the carrier-chain can be discharged therefrom. The rotation of the cam-carrying wheel B' can then be stopped by disconnecting it from the motive power, and the entire machine will be at rest with the parts in position for beginning full operation again when desired, upon the reconnection of the cam-carrying wheel B' with its driving device, the inward swing of the clutch-lever, and the movement of the swinging plate G² into position to bring pinion G³ into mesh with gear-wheel G⁴. The machine will then be thrown into full operation, even without the application of power to the wheel B', which is fixed on shaft B, though we prefer to apply power to such wheel through belt X' when the whole machine is to be continuously operated.

Having thus described our invention, what we claim is—

1. In combination with a piece containing a series of openings through which strips can be passed, a series of cutter-bars, means for guiding the latter, an actuating-head connected with the bars, and a series of spring-pressure devices, one for each bar, pressing the forward portions of such bars toward the face of the piece in which are the openings, substantially as and for the purpose shown.

2. In combination with a piece containing a series of openings, through which strips can be passed, a series of cutter-bars, one for each opening, means for guiding such bars, an actuating-head connected with the bars, a series of springs one for each cutter-bar, and the series of movable pieces interposed between the springs and the respective cutter-bars, whereby the pressure of the springs, toward the face of the piece containing the openings, is transmitted to the forward portions of the cutter-bars, substantially as and for the purpose set forth.

3. In combination with the plate containing the guiding-openings for the material to be cut, the series of cutter-bars, having their cutting ends sliding over such plate, the plate provided with the grooves for guiding the bars, a series of springs one for each of the bars, the movable plugs between the springs and the cutter-bars, and means for actuating such bars, to slide them over the openings in the first-named plate, substantially as and for the purpose described.

4. In combination with a supporting-plate, and the series of cutter-bars sliding over the same, the plate provided with the guiding-grooves for the cutter-bars, springs attached to the latter plate, movable pieces guided in holes in the plate, and engaging with their opposite ends the springs and the cutter-bars, the plate situated on the side of the forward portions of the cutter-bars which is opposite to the faces thereof, which are engaged by the movable spring-pressed pieces, and having in it the strip-guiding openings, one for each cutter-bar, situated in front of the respective bars, so that the edges of the latter slide over them, as the bars are advanced, and means for reciprocating the bars, substantially as and for the purpose specified.

5. In combination with the series of cutter-bars having holes, a reciprocating head having the grooves to receive the bars, and the holes coinciding with those in the cutter-bars, pins passing through the holes in the latter and in the head, a plate attached to the head, and having holes to receive the ends of the pins, and a second plate detachably attached to the head, abutting against the ends of the pins opposite to those in the perforated plate, substantially as and for the purpose shown.

6. In combination with the strip-feeding rolls, the one having a series of strip-receiving circumferential grooves, and the other an elastic face opposing the grooved surface of the former roll, the series of clearing-pins projecting into the grooves of the grooved roll, adapted to scrape and clear out any clogging material from such grooves, and the scraper-plate having its edge close against the periphery of the grooved roll so as to clean the portions of the face thereof which are between the grooves, substantially as and for the purpose set forth.

7. In combination with the drawing-rolls, and the gear-wheel connected therewith, so as to rotate them, a driven gear-wheel, a pivoted frame swinging on a pivot substantially in line with the axis of the latter wheel, a gear-wheel carried by this frame and meshing with the driven gear, and a pinion, removably connected with this gear-wheel on the swinging frame, situated so as to be moved toward and from the gear-wheel connected with the drawing-rolls as the frame is swung on its pivot, substantially as and for the purpose specified.

8. In combination with the drawing-rolls, and the gear-wheel connected therewith, so as to rotate the same, a driven gear-wheel, a pivoted frame swinging on a pivot substantially in line with the axis of rotation of the driven gear-wheel, a rotating gear-wheel supported on the frame, situated so as to be in gear with the driven wheel, and having a hub adapted to be moved toward and from the gear-wheel connected with the drawing-rolls, by movement of the swinging frame, a pinion detachably secured upon this hub, so as to be readily removed and replaced by another of a different number of teeth, and means for fixing the frame at different points in its swing, substantially as and for the purpose shown.

9. In combination with the drawing-rolls, and the gear-wheel connected therewith, so as to rotate them, a driven gear-wheel, the pivoted frame swinging about an axis, substantially in line with that of the driven gear-wheel, the gear-wheel journaled upon a suitable bearing on the frame, and meshing with the driven wheel, the pinion, detachably secured on the hub of the wheel carried by the frame, a threaded pin on the frame, projecting through a slot in a fixed plate, and a nut on such pin engaging the fixed plate, so as to hold the pivoted frame from swinging, substantially as and for the purpose set forth.

10. In a machine for making matches, the moving carrier for receiving and holding the match-sticks, having a series of grooves to receive the sticks, separate independently-movable spring-clamping devices, one for each groove to engage and hold the sticks in the grooves, in combination with means for inserting the match-sticks in the grooves of the carrier, and an opener to engage and press the separate spring devices back from the grooved faces of the carrier, to permit the insertion of the sticks in the grooves and then release them, so that they spring against the groove-held strips, substantially as and for the purpose specified.

11. In a machine for making matches, the match-stick-holding carrier, having a portion provided with a series of stick-receiving grooves, and a series of independently-movable spring-fingers one for each groove, to engage and hold the sticks inserted therein, substantially as and for the purpose shown.

12. In combination with the carrier having a portion provided with a series of grooves to receive the match-sticks, and the series of separate independently-movable spring-fingers one for each groove opposite such grooves, an opener to engage and force such fingers away from the grooved face on the carrier, to allow the insertion of the match-sticks in the grooves, and then release the fingers to allow them to engage the sticks in the grooves, substantially as and for the purpose set forth.

13. In combination with the carrier having a portion provided with a series of grooves to receive the match-sticks, and a series of independently-movable spring-fingers opposite such grooves, the opener to press such fingers back, to allow insertion of the sticks in the grooves, having the series of fingers to engage the stick-holding spring-fingers, on opposite sides of the grooves of the carrier, substantially as and for the purpose described.

14. In combination with the carrier a bar provided with a series of grooves, and a series of separate independently-movable spring-fingers, one for each groove, springing toward the grooved face of the bar, an opener to force such fingers back from the grooved face, having the fingers, to engage the spring-fingers, separated from each other by spaces coinciding with the grooves in the carrier-bar, substantially as and for the purpose specified.

15. In a carrier for match-sticks and the like, in combination with a bar having a series of splint-receiving grooves, a plate attached to a suitable support and having formed on it a series of separate independently-movable spring-fingers, one for each groove, arranged so that their free portions will spring toward the grooves and will press upon any match-sticks therein, substantially as and for the purpose specified.

16. In a carrier for match-sticks and the like, in combination with two adjoining bars having grooves in their opposing faces, a plate having its opposite sides made into a series of spring-fingers to engage the contents of the grooves, in the respective bars, substantially as and for the purpose set forth.

17. In a carrier for match-sticks and the like, in combination with two adjoining bars having grooves in their inner or opposing faces, a plate bent on a longitudinal line, to bring its opposing sides down opposite grooved faces of the bars, and having such sides divided to form series of separate spring-fingers, for the different grooves, and a support for such plate, substantially as and for the purpose described.

18. In a carrier for match-sticks, and the like, in combination with two adjoining bars having grooves in their inner or opposing faces, a rod supported on the carrier, and a plate supported on such rod, bent so that its sides extend down into the space between the grooved bars, and having such sides divided to form separate outwardly-springing fingers, one for each groove in the adjoining face of the carrier-bar, substantially as and for the purpose specified.

19. In a carrier for match-sticks and the like, in combination with three parallel bars having their opposing sides and faces grooved, the plates bent to bring their sides down close to the opposite grooved faces of adjoining bars, and such sides divided up into separate spring-fingers one for each groove in the respective bar-face, substantially as and for the purpose shown.

20. In a carrier for match-sticks, and the like, in combination with three parallel bars having their opposing faces grooved, the rods supported over the spaces between the bars, and the plates supported on these rods having on their opposite sides a series of separate spring-fingers projecting downward between the adjoining bars, and tending to normally spring outward toward the grooved faces of such bars, substantially as and for the purpose set forth.

21. The carrier having bars to receive the match-sticks, in combination with links for connecting adjacent bars, provided with openings into which the bar ends project, and by which such ends are engaged, in combination with driving means to engage the projecting ends of the bars and move the carrier along, substantially as and for the purpose specified.

22. The carrier having bars to receive the match-sticks, in combination with links of which each one is rigidly connected with one of the bars, and pivotally connected with another, so that the latter can rock with reference to the former bar, substantially as and for the purpose shown.

23. The carrier consisting of sections, having bars to receive the match-sticks, in combination with links attached to one section and engaging the projecting ends of one of the bars of the next section, substantially as and for the purpose shown.

24. The carrier consisting of sections having bars to receive the match-sticks, in combination with links attached to one section and provided with an opening with convex face, to engage the projecting ends of one of the bars of the next section, substantially as and for the purpose set forth.

25. In combination with the carrier-sections each having the three transverse bars adapted to receive the match-sticks, and the front and rear bars made thinner than the middle one, the links attached to each section, each provided with an opening with convex rear side to engage the rear face of the front bar of the next section, substantially as and for the purpose described.

26. In combination with the carrier-sections each consisting of three bars of which the middle one is grooved to receive the match-sticks on its front and rear sides, and the others are made thinner and correspondingly grooved, but only on their sides turned toward the middle bar, and plates attached to and extending rearward from each section, having openings to allow the passage of the projecting ends of the rear bar of their respective section, and the front bar of the following one, and convex faces at the rear sides of such openings, to engage the rear side of the latter bar, such bar having its upper and lower edges rounded off to allow rocking of the plates with relation to the bar, substantially as and for the purpose specified.

27. In combination with a carrier having bars provided with series of match-stick-receiving grooves, a series of separate and independently-movable spring devices for each grooved bar, to hold the sticks in the respective grooves, the reciprocating opener, adapted to engage and force back from each bar the respective series of spring devices, and means for reciprocating it, to move it toward and out of engagement with such devices, substantially as and for the purpose specified.

28. In combination with a carrier having transverse series of match-stick-receiving grooves, and series of separate spring holding-fingers to act with such grooves, the reciprocating head carrying a series of opening-fingers to engage said spring-fingers, and force them away from the respective grooves, means for reciprocating said head, and means for feeding the sticks into the grooves, while the spring holding-fingers are thus retracted, substantially as and for the purpose described.

29. In combination with a carrier having transverse series of match-stick-receiving grooves, and spring holding devices to grip the sticks in such grooves, the reciprocating head carrying a series of opening-fingers, to engage such spring-holding devices, and force them away from the grooves, such fingers being separated from each other, so as to allow for the passage of the sticks up into the grooves, means for moving such head, and means for feeding the material for the sticks up into the grooves of the carrier, while the opener is down in operative position, substantially as and for the purpose specified.

30. In combination with a carrier having a series of oppositely-turned faces equidistant from each other, provided with match-stick-receiving grooves, and spring-holding devices, to hold the sticks in the grooves, means for moving the carrier with a step-by-step motion, so as to bring the faces in which are the grooves, successively to a given line, the opener adapted to engage and press the spring-holding devices back from the respective series of grooves, means for reciprocating such opener toward and from its operative position, and means for giving it alternately a slight forward and back motion with reference to the travel of the carrier, before it moves to engage the spring holding devices, substantially as and for the purpose shown.

31. In combination with a carrier having a series of oppositely-turned faces equidistant from each other, provided with match-stick-receiving grooves, and spring-holding devices to hold the sticks in such grooves, means for giving the carrier a step-by-step movement equal to the distance between two of its adjacent faces, the reciprocating opener to engage and press the spring-holding devices back from their respective grooves, having a head guided in plates, so as to move toward and from the plane of the carrier, means for reciprocating such head, and means for moving the plates, in which the head is guided, forward and back with reference to the travel of the carrier, so that successive opening movements of the opener, will be in different planes, to enable it to pass the successive grooved faces of the carrier, substantially as and for the purpose set forth.

32. In combination with the carrier having a series of oppositely-turned faces equidistant from each other, provided with match-stick-receiving grooves, and spring-holding devices to hold the sticks in the latter, means for giving the carrier a step-by-step movement equal to the distance between two of its adjacent faces, the reciprocating opener to engage and force back the spring holding devices from their respective grooves, having a head, plates with guides for such head, to guide it in its movements toward and from the carrier, means for reciprocating the head in such guides, and the cam mechanism connected with the guide-plates, to move them alternately forward and back with relation to the travel of the carrier, substantially as and for the purpose described.

33. In combination with the reciprocating opener-head, the rock-shaft, the arms thereon and the links connecting the head with such arms, the plates having guides for the opposite ends of the head, the bars connected with such plates, the cams engaged by bearing devices on the bars, so as to move the latter and the plates in one direction at a right angle to the reciprocation of the head on such plates, springs to return the bars, and means for guiding the head in its movements with such bars, substantially as and for the purpose specified.

34. In a match-making machine, in combination with the traveling carrier having opposing splint-holding devices, to receive the splints between them, a movable head carrying a part to pass between the opposing splint-holding devices, means for moving such head toward and from the carrier, and means for moving it in a direction substantially parallel to the travel of the carrier, substantially as and for the purpose specified.

35. In a match-making machine, in combination with the traveling carrier having opposing splint-holding devices, to receive the splints between them, a movable head carrying a part to pass between the opposing splint-holding devices, means for moving the head toward and from the carrier, and a spring tending to move the head in a direction substantially parallel to the travel of the carrier, substantially as and for the purpose shown.

36. In a match-making machine, in combination with the traveling carrier having opposing splint-holding devices, to receive the splints between them, a movable head carrying a part to pass between the opposing splint-holding devices, means for moving the head toward and from the carrier, positively-acting means to move the head in a direction substantially parallel to the travel of the carrier, and a spring tending to move the head in the opposite direction, substantially as and for the purpose described.

37. In combination with a carrier having spring devices to engage the match-sticks, a reciprocating opener to engage such spring devices and force them back out of stick-engaging position, a moving bar connected with the opener to operate the same, cam mechanism moving the bar, to carry the opener away from the spring devices, a spring to return the bar, and means for moving the bar against the stress of the spring, and holding it as so moved, when it is desired to keep the opener from acting upon the stick-engaging spring devices, substantially as and for the purpose specified.

38. In a match-making machine, in combination with the traveling carrier to receive and hold the match-sticks, while being treated, and the devices for treating the sticks so held, a discharging device to discharge the completed matches from the carrier, and a pusher situated beyond the stick-treating devices, adapted to engage and push outward, before they reach the discharging device, the rear ends of the match-sticks projecting beyond the rear or inner side of the carrier, substantially as and for the purpose shown.

39. In a match-making machine, in combination with the traveling carrier to receive and hold the match-sticks, while being treated and devices for applying the heads to the splints, so held, a discharging device to discharge the completed matches from the carrier, and the reciprocating pusher-plate moved toward and from the carrier, at a point where it can engage and push forward the rear ends of the matches after the latter have passed the head-applying devices, and before they come into position in front of the discharging device, substantially as and for the purpose set forth.

40. In a match-making machine, in combination with the traveling carrier to receive and hold the match-sticks, while being treated and devices for treating the sticks, the reciprocating punches for discharging the completed matches from the carrier, and the reciprocating pusher-plate operating at a point, in the travel of the matches with the carrier, between the treating devices and the discharging-punches, adapted to engage and push outward, into such position that they can pass, with the motion of the carrier in front of the punches, the rear ends of any matches projecting beyond the carrier and means for actuating the pusher-plate, substantially as and for the purpose described.

41. In a match-making machine, in combination with the carrier to receive and hold the match-sticks, while being treated, the reciprocating head carrying the discharging-punches, means for actuating such head, and the pusher-plate connected with the head, so as to move with the same, arranged to engage the ends of match-sticks projecting beyond the carrier, at a point before such sticks are brought to the punches by the movement of the carrier, substantially as and for the purpose specified.

In testimony that we claim the foregoing we have hereunto set our hands this 12th day of March, A. D. 1895.

EBENEZER B. BEECHER.
JACOB P. WRIGHT.

Witnesses:
L. W. BEECHER,
H. D. STANNARD.